(12) United States Patent
Burton et al.

(10) Patent No.: US 12,243,733 B2
(45) Date of Patent: *Mar. 4, 2025

(54) MULTI-ATOMIC OBJECT CRYSTAL TRANSPORT THROUGH ATOMIC OBJECT CONFINEMENT APPARATUS JUNCTION

(71) Applicant: Quantinuum LLC, Broomfield, CO (US)

(72) Inventors: William Cody Burton, Northglen, CO (US); Brian Estey, Louisville, CO (US); Ian Hoffman, Arvada, CO (US); Curtis Volin, Marietta, GA (US)

(73) Assignee: Quantinuum LLC, Broomfield, CO (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/664,096

(22) Filed: May 19, 2022

(65) Prior Publication Data

US 2023/0035427 A1 Feb. 2, 2023

Related U.S. Application Data

(60) Provisional application No. 63/203,029, filed on Jul. 6, 2021.

(51) Int. Cl.
*H01J 49/06* (2006.01)
*H01J 49/42* (2006.01)

(52) U.S. Cl.
CPC .......... *H01J 49/062* (2013.01); *H01J 49/426* (2013.01)

(58) Field of Classification Search
CPC .... H01J 49/062; H01J 49/426; H01J 49/0013; H01J 49/422; G06N 10/20; G06N 10/40
See application file for complete search history.

(56) References Cited

FOREIGN PATENT DOCUMENTS

| EP | 3839980 A2 | 6/2021 |
| JP | 2007-165335 A | 6/2007 |
| JP | 2008-282595 A | 11/2008 |

OTHER PUBLICATIONS

Wright et al., Reliable transport through a microfabricated X-junction surface-electrode ion trap, arXiv (Feb. 25, 2013), https://arxiv.org/pdf/1210.3655.pdf (Year: 2013).*

(Continued)

*Primary Examiner* — David E Smith
*Assistant Examiner* — Christopher J Gassen
(74) *Attorney, Agent, or Firm* — Alston & Bird LLP

(57) ABSTRACT

A multi-atomic object crystal is transported from a first leg to a second leg of an atomic object confinement apparatus through a corresponding junction. Voltage sources in electrical communication with electrodes of the apparatus are controlled to confine the crystal in the first leg. The voltage sources are controlled to cause transport of the crystal along the first leg to proximate the junction and then to cause generation of a time-dependent potential at the junction that is configured to cause the crystal to traverse a transport path through the junction from the first leg to the second leg via a dynamic potential well defining a particular variable axial frequency. The transport path is determined by combining a path of constant total confinement for a representative atomic object of the crystal and a path of radio frequency minimum for the representative atomic object, using a particular variable path ratio.

20 Claims, 8 Drawing Sheets

(56) References Cited

OTHER PUBLICATIONS

Mokhberi et al., Optimised surface-electrode ion-trap junctions for experiments with cold molecular ions, arXiv (Jan. 23, 2017), https://arxiv.org/pdf/1701.06408.pdf [hereinafter Mokhberi] (Year: 2017).*

Bruzewicz et al., Trapped-ion quantum computing: Progress and challenges featured, Appl. Phys. Rev. 6, 021314 (2019) (Year: 2019).*

Blakestad, R. Bradford, "Transport of Trapped-Ion Qubits within a Scalable Quantum Processor," Ph.D. Thesis, University of Colorado (2010) retrieved from the Internet at <URL: https://www.nist.gov/system/files/documents/2017/05/09/blakestad2010thesis.pdf> on Feb. 1, 2023, 240 pages.

Bowler, Ryan, et al., "Coherent Diabatic Ion Transport and Separation in a Multi-Zone Trap Array," Physical Review Letters, Aug. 20, 2012, vol. 109, No. 080502, retrieved from the Internet at <URL: https://link.aps.org/accepted/10.1103/PhysRevLett.109.080502> on Feb. 1, 2023, 6 pages.

Bruzewicz, Colin D., et al., "Trapped-ion quantum computing: Progress and challenges", Applied Physics Reviews, May 29, 2019, pp. 021314-1 to 021314-46 vol. 6, No. 2, AIP Publishing, US.

Kielpinski, David, et al., "Architecture for a large-scale ion-trap quantum computer", Nature, Jun. 13, 2002, pp. 709-711, vol. 417, retrieved from the Internet at <URL: https://www.researchgate.net/publication/11308739_Architecture_for_a_large-scale_ion-trap_quantum_computer/link/0912f50c7546f933b9000000/download> on Feb. 1, 2023.

Lekitsch, Bjoern, et al., "Blueprint for a microwave trapped ion quantum computer", Science Advances, Feb. 1, 2017, vol. 3, retrieved from the Internet at <URL: https://www.science.org/doi/pdf/10.1126/sciadv.1601540> on Feb. 1, 2023, 12 pages.

Mokhberi, A., et al., "Optimised surface-electrode ion-trap junctions for experiments with cold molecular ions", New Journal of Physics, Jan. 17, 2017, retrieved from the Internet at <URL: https://arxiv.org/pdf/1701.06408.pdf>, 19 pages.

Murali, Parkash, et al., "Architecting Noisy Intermediate-Scale Trapped Ion Quantum Computers", ISCA 2020, Apr. 9, 2020, retrieved from the Internet at <URL: https://arxiv.org/pdf/2004.04706.pdf> on Feb. 1, 2023, 14 pages.

Outgoing—ISA/210—International Search Report Mailed on Oct. 11, 2022 for WO Application No. PCT/US22/036212.

Outgoing Written Opinion of the ISA Mailed on Oct. 11, 2022 for WO Application No. PCT/US22/036212.

Shu, G., et al., "Heating and ion transport in a Y-junction surface-electrode trap", Phys. Rev. A 89, Mar. 19, 2014, vol. 062308, retrieved from the Internet at <URL: https://arxiv.org/pdf/1403.4874.pdf> on Feb. 1, 2023, 14 pages.

Splatt, F., et al., "Deterministic reordering of 40Ca+ ions in a linear segmented Paul trap," New Journal of Physics, 2009, vol. 11, No. 103008, retrieved from the Internet at <URL: https://iopscience.iop.org/article/10.1088/1367-2630/11/10103008/pdf> on Feb. 1, 2023, 18 pages.

Webber, Mark, et al., "Efficient Qubit Routing for a Globally Connected Trapped Ion Quantum Computer," Adv. Quantum Technol., Jul. 7, 2020, vol. 3, No. 8, 2000027, retrieved from the Internet at <URL: https://onlinelibrary.wiley.com/doi/epdf/10.1002/qute.202000027> on Feb. 1, 2023, 11 pages.

Wineland, D. J., et al., "Experimental Issues in Coherent Quantum-State Manipulation of Trapped Atomic Ions," J. Res. Natl. Inst. Stand. Technol., May-Jun. 1998, pp. 259-328, vol. 103, No. 3, retrieved from the Internet at <URL: https://tf.nist.gov/general/pdf/1275.pdf> on Feb. 1, 2023, 70 pages.

Wolfgang, Paul, "Electromagnetic traps for charged and neutral particles," Reviews of Modern Physics, Jul. 1990, pp. 531-540, vol. 62, No. 3, retrieved from the Internet at <URL: https://iontrap.umd.edu/wp-content/uploads/2013/10/electromagnetic-traps-for-charged-and-neutral-particles-Paul.pdf> on Feb. 1, 2023, 12 pages.

Wright, Kenneth, et al., "Reliable transport through a microfabricated X-junction surface-electrode ion trap," New J. Phys., Mar. 2013, vol. 15, No. 033004, retrieved from the Internet at <URL: https://iopscience.iop.org/article/10.1088/1367-2630/15/3/033004/pdf> on Feb. 1, 2023, 13 pages.

Non-Final Rejection Mailed on May 2, 2024 for U.S. Appl. No. 18/106,434, 10 page(s).

Final Rejection Mailed on Sep. 9, 2024 for U.S. Appl. No. 18/106,434, 6 page(s).

Notice of Allowance and Fees Due (PTOL-85) Mailed on Oct. 30, 2024 for U.S. Appl. No. 18/106,434, 8 page(s).

English Translation of JP Notice of Allowance dated Nov. 18, 2024 for JP Application No. 2024500376, 2 page(s).

JP Notice of Allowance Mailed on Nov. 18, 2024 for JP Application No. 2024500376, 3 page(s).

* cited by examiner

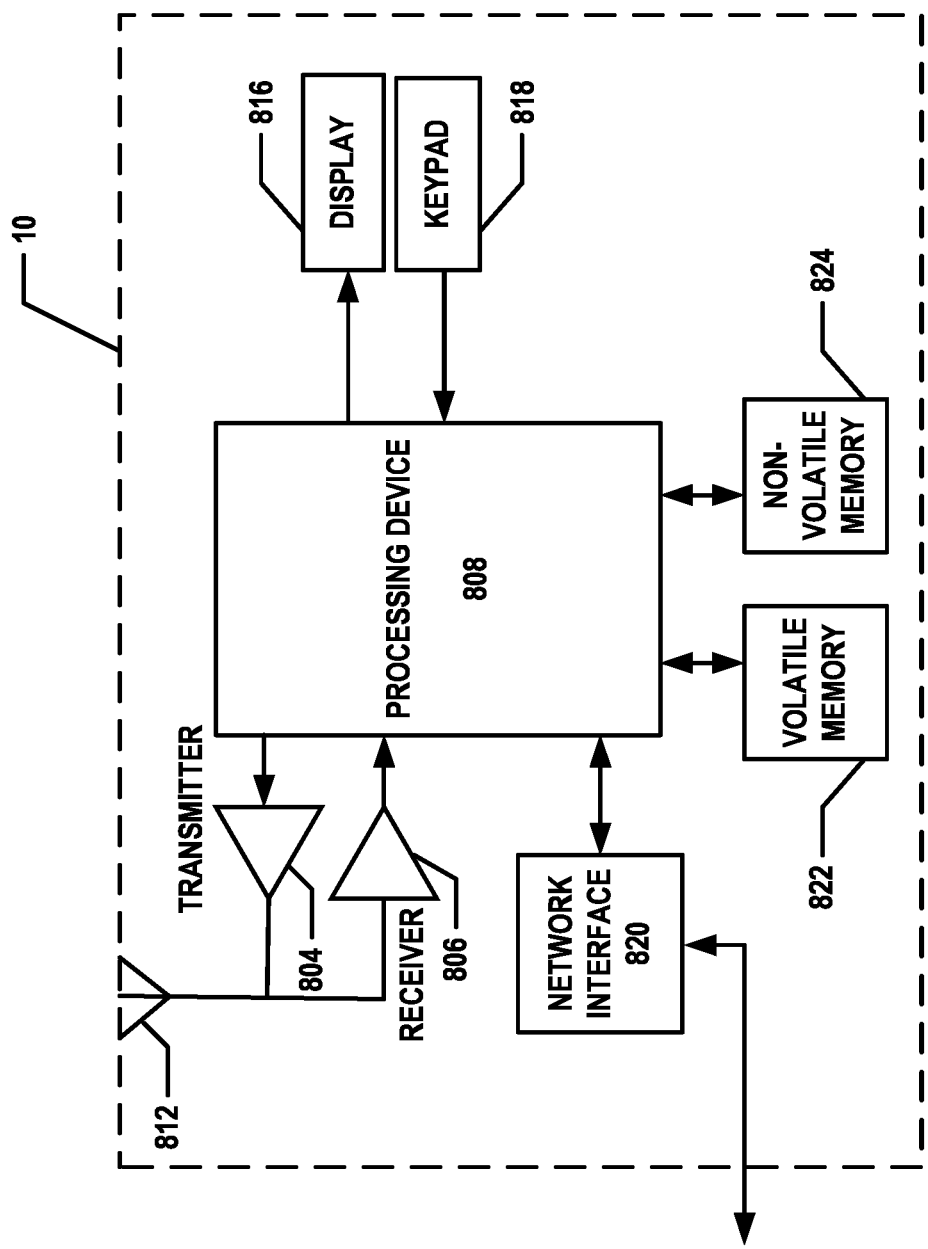

MULTI-ATOMIC OBJECT CRYSTAL TRANSPORT THROUGH ATOMIC OBJECT CONFINEMENT APPARATUS JUNCTION

CROSS-REFERENCE TO RELATED APPLICATIONS

This application claims priority to U.S. Application No. 63/203,029, filed Jul. 6, 2021, the content of which is hereby incorporated by reference in its entirety.

TECHNICAL FIELD

Various embodiments relate to apparatuses, systems, and methods relating to controlling atomic objects within a two or three-dimensional atomic object confinement apparatus comprising at least one junction. For example, some example embodiments relate to the transport of multi-atomic object crystals through a junction of an atomic object confinement apparatus.

BACKGROUND

An ion trap can use a combination of electrical and magnetic fields to capture a plurality of ions in a potential well. Ions can be trapped for a number of purposes, which may include mass spectrometry, research, and/or controlling quantum states of the trapped ions, for example. In various scenarios, a multi-dimensional (e.g., two-dimensional) ion trap may be used to trap a plurality of ions. In general, a multi-dimensional ion trap comprises a plurality of one-dimensional trap portions that are connected to one another via at least one junction. However, conventional multi-dimensional ion traps and/or conventional techniques for operating multi-dimensional ion traps are not capable of reliable transport of multi-ion crystals through the junction(s) of the multi-dimensional ion trap. Through applied effort, ingenuity, and innovation many deficiencies of such prior ion traps and methods of operation therefore have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for transporting multi-atomic object crystals through a junction of a multi-dimensional atomic object confinement apparatus. In various embodiments, the multi-atomic object crystals comprise two or more species of atomic objects. In various embodiments, an atomic object is an ionic atom an ionic molecule, and/or the like and a multi-atomic object crystal is a group of ionic atoms, ionic molecules, and/or the like that are physically associated with one another. In various embodiments, the atomic object confinement apparatus is an ion trap or other confinement apparatus configured to confine a plurality of atomic objects.

According to a first aspect, a method for controlling an atomic object confinement apparatus to cause the transportation of a multi-atomic object crystal through a junction of the atomic object confinement apparatus is provided. The junction is formed by two or more legs of the atomic object confinement apparatus, with at least two of the two or more legs defining directions, at least proximate the junction, that are transverse (e.g., not parallel) to one another. The atomic object confinement apparatus comprises a plurality of electrodes. In an example embodiment, the method comprises controlling one or more voltage sources to cause generation of a time-dependent potential by applying controlling voltage signals to at least a portion of the plurality of electrodes. The time-dependent potential is configured to generate a potential well that travels through the junction from the first leg to a second leg of the two or more legs of the atomic object confinement apparatus to cause the multi-atomic object crystal to traverse a transport path through the junction from the first leg to a second leg of the two or more legs of the atomic object confinement apparatus. The transport path is determined based at least in part on a combination of at least (a) a path of constant total confinement for a representative atomic object of the multi-atomic object crystal and (b) a path of radio frequency minimum for the representative atomic object of the multi-atomic object crystal. The combination of the path of constant total confinement and the path of radio frequency minimum is determined based on a particular variable path ratio.

In an example embodiment, the path of constant total confinement is a path through the junction where the total confinement at each point along the path is approximately the same (e.g., constant), for a particular atomic object.

In an example embodiment, the path of constant total confinement and the path of radio frequency minimum correspond to the geometry of the atomic object confinement apparatus. In an example embodiment, the particular variable path ratio depends on both frequency of periodic voltage signals applied to radio frequency rails of the atomic object confinement apparatus and the particular axial frequency.

In an example embodiment, the multi-atomic object comprises a first atomic object of a first species having a first mass and a second atomic object of a second species having a second mass, the first mass is greater than the second mass. In an example embodiment, the representative atomic object is one of (a) the first atomic object, (b) the second atomic object, (c) a reduced atomic object having physical properties determined based on reduced physical properties of two or more atomic objects of the multi-atomic object crystal, or (d) an average atomic object having physical properties determined based on average physical properties of the two or more atomic objects.

In an example embodiment, the method further comprises controlling a manipulation source to cause the manipulation source to generate and provide a sympathetic cooling beam such that the sympathetic cooling beams is incident on the multi-atomic object crystal while the multi-atomic object crystal traverses the junction.

In an example embodiment, the atomic object confinement apparatus is part of a quantum processor, the multi-atomic object crystal comprises a first atomic object used as a qubit atomic object of the quantum processor, and the multi-atomic object crystal comprises a second atomic object used as a sympathetic cooling atomic object. In an example embodiment, order of atomic objects within the multi-atomic object crystal may be changed as the multi-atomic object crystal traverses the transport path.

In an example embodiment, each leg of the two or more legs defines a one-dimensional portion of the atomic object confinement apparatus and the atomic object confinement apparatus is a multi-dimensional atomic object confinement apparatus.

In an example embodiment, the controlling voltage signals are generated based on a waveform series determined based on the combination of at least (a) the path of constant total confinement for the representative atomic object and (b) the path of radio frequency minimum for the representative atomic object, based on at least one of (a) the particular variable path ratio or (b) the particular variable axial frequency, the at least one of (a) the particular variable path ratio or (b) the particular variable axial frequency is configured to minimize at least non-adiabatic excitation of the multi-atomic object as a result of traversing the transport path.

In an example embodiment, the method further comprises, responsive to determining that the multi-atomic object crystal is to be transported from the first leg to the second leg through the junction, accessing the waveform series from memory, wherein the waveform series is defining the particular variable axial frequency.

In an example embodiment, the waveform series is configured to cause the representative atomic object to traverse a path that is the combination of at least (a) the path of constant total confinement for the representative atomic object and (b) the path of radio frequency minimum for the representative atomic object.

In an example embodiment, the combination is a linear combination of (a) the path of constant total confinement for the representative atomic object, (b) the path of radio frequency minimum for the representative atomic object, (c) a path of minimal motional excitation for a first atomic object of the multi-atomic object crystal, and (d) a path of minimal motional excitation for a second atomic object of the multi-atomic object crystal.

In an example embodiment, at least one of (a) the particular variable path ratio, (b) a particular variable axial frequency characterizing the potential well, or (c) at least one principal axis of time-dependent potential is different at a first point along the transport path than at a second point along the transport path.

In an example embodiment, the particular variable path ratio is within a range of 0 to 1 inclusive at least a start point located on the first leg and an end point located on the second leg.

In an example embodiment, the method comprises controlling the one or more voltage sources in electrical communication with one or more respective electrodes of the atomic object confinement apparatus to cause the atomic object confinement apparatus to confine at least one multi-atomic object crystal in the first leg of the two or more legs and controlling the one or more voltage sources to cause transportation of the multi-atomic object crystal along the first leg to proximate the junction.

In an example embodiment, the potential well is characterized by a particular variable axial frequency.

According to another aspect, a controller configured to control operation of an atomic object confinement apparatus to cause the transportation of a multi-atomic object crystal through a junction of the atomic object confinement apparatus is provided. In an example embodiment, the controller comprises at least one processing device, memory storing executable instructions, and one or more driver controller elements. The atomic object confinement apparatus comprises a junction connecting a first leg of the atomic object confinement apparatus to at least a second leg of the atomic object confinement apparatus. The executable instructions are configured to, when executed by the processing device, cause the controller to at least cause the one or more driver controller elements to control the one or more voltage sources to cause generation of a time-dependent potential by applying controlling voltage signals to at least a portion of the plurality of electrodes. The time-dependent potential travels through the junction from the first leg to the second leg to cause the multi-atomic object crystal to traverse a transport path through the junction from the first leg to a second leg of the two or more legs of the atomic object confinement apparatus. The transport path is determined based at least in part on a combination of at least (a) a path of constant total confinement for a representative atomic object of the multi-atomic object crystal and (b) a path of radio frequency minimum for the representative atomic object of the multi-atomic object crystal. The combination of the path of constant total confinement and the path of radio frequency minimum is determined based on a particular variable path ratio.

In an example embodiment, the executable instructions are further configured to, when executed by the processing device, cause the controller to at least cause the one or more driver controller elements to control one or more voltage sources in electrical communication with one or more respective electrodes of an atomic object confinement apparatus to cause the atomic object confinement apparatus to confine at least one multi-atomic object crystal in the first leg of the atomic object confinement apparatus. In an example embodiment, the executable instructions are further configured to, when executed by the processing device, cause the controller to at least cause the one or more driver controller elements to control the one or more voltage sources to cause transportation of the multi-atomic object crystal along the first leg to proximate the junction.

In an example embodiment, the time-dependent potential is configured to generate a potential well characterized by a particular variable axial frequency.

In an example embodiment, the path of constant total confinement and the path of radio frequency minimum correspond to the geometry of the atomic object confinement apparatus. In an example embodiment, the particular variable path ratio depends on both frequency of periodic voltage signals applied to radio frequency rails of the atomic object confinement apparatus and the particular axial frequency.

In an example embodiment, the multi-atomic object comprises a first atomic object of a first species having a first mass and a second atomic object of a second species having a second mass, the first mass is greater than the second mass.

In an example embodiment, the representative atomic object is one of (a) the first atomic object, (b) the second atomic object, (c) a reduced atomic object having physical properties determined based on reduced physical properties of two or more atomic objects of the multi-atomic object crystal, or (d) an average atomic object having physical properties determined based on average physical properties of the two or more atomic objects.

In an example embodiment, the executable instructions are further configured to, when executed by the processing device, cause the controller to at least control operation of a manipulation source to cause the manipulation source to generate and provide a sympathetic cooling beam such that the sympathetic cooling beams is incident on the multi-atomic object crystal while the multi-atomic object crystal traverses the junction.

In an example embodiment, the atomic object confinement apparatus is part of a quantum processor, the multi-atomic object crystal comprises a first atomic object used as a qubit atomic object of the quantum processor, and the multi-atomic object crystal comprises a second atomic object used as a sympathetic cooling atomic object.

In an example embodiment, order of atomic objects within the multi-atomic object crystal is changed as the multi-atomic object crystal traverses the transport path. In an example embodiment, each leg of the two or more legs defines a one-dimensional portion of the atomic object confinement apparatus and the atomic object confinement apparatus is a multi-dimensional atomic object confinement apparatus.

In an example embodiment, the controlling voltage signals are generated based on a waveform series determined based on the combination of at least (a) the path of constant total confinement for the representative atomic object and (b) the path of radio frequency minimum for the representative atomic object, based on at least one of (a) the particular variable path ratio or (b) the particular axial frequency, the at least one of (a) the particular variable path ratio or (b) the particular axial frequency configured to minimize at least non-adiabatic excitation of the multi-atomic object as a result of traversing the transport path.

In an example embodiment, the waveform series is stored in the memory and the executable instructions are further configured to, when executed by the processing device, cause the controller to at least, responsive to determining that the multi-atomic object crystal is to be transported from the first leg to the second leg through the junction, accessing the waveform series from memory, wherein the waveform series defines the particular variable axial frequency.

In an example embodiment, the waveform series is configured to cause the representative atomic object to traverse a path that is the combination of at least (a) the path of constant total confinement for the representative atomic object and (b) the path of radio frequency minimum for the representative atomic object.

In an example embodiment, the combination is a linear combination of (a) the path of constant total confinement for the representative atomic object, (b) the path of radio frequency minimum for the representative atomic object, (c) a path of minimal non-adiabatic excitation for a first atomic object of the multi-atomic object crystal, and (d) a path of minimal non-adiabatic excitation for a second atomic object of the multi-atomic object crystal.

In an example embodiment, at least one of (a) the particular variable path ratio, (b) the particular variable axial frequency, or (c) at least one principal axis of the confining potential is different at a first point along the transport path than at a second point along the transport path.

In an example embodiment, the particular variable path ratio is within a range of 0 to 1 inclusive at least a start point located on the first leg and an end point located on the second leg.

According to still another aspect, a quantum computer is provided. The quantum computer comprise an atomic object confinement apparatus, one or more voltage sources, and a controller. The controller is configured to control operation of an atomic object confinement apparatus to at least cause the transportation of a multi-atomic object crystal through a junction of the atomic object confinement apparatus. In an example embodiment, the controller comprises at least one processing device, memory storing executable instructions, and one or more driver controller elements. The atomic object confinement apparatus comprises a junction connecting a first leg of the atomic object confinement apparatus to at least a second leg of the atomic object confinement apparatus. The controller is configured to cause the one or more driver control elements to control the one or more voltage sources to cause the one or more driver controller elements to control the one or more voltage sources to cause generation of a time-dependent potential by applying controlling voltage signals to at least a portion of the plurality of electrodes. The time-dependent potential is configured to generate a potential well that travels through the junction from the first leg to a second leg of the two or more legs of the atomic object confinement apparatus to cause the multi-atomic object crystal to traverse a transport path through the junction from the first leg to a second leg of the two or more legs of the atomic object confinement apparatus. The transport path is determined based at least in part on a combination of at least (a) a path of constant total confinement for a representative atomic object of the multi-atomic object crystal and (b) a path of radio frequency minimum for the representative atomic object of the multi-atomic object crystal. The combination of the path of constant total confinement and the path of radio frequency minimum is determined based on a particular variable path ratio.

In an example embodiment, the controller is further configured to cause the one or more driver controller elements to control the one or more voltage sources in electrical communication with one or more respective electrodes of the atomic object confinement apparatus to cause the atomic object confinement apparatus to confine at least one multi-atomic object crystal in the first leg of the atomic object confinement apparatus. The controller is further configured to cause the one or more driver controller elements to control the one or more voltage sources to cause transportation of the multi-atomic object crystal along the first leg to proximate the junction.

In an example embodiment, the time-dependent potential is configured to generate a potential well characterized by a particular variable axial frequency.

In an example embodiment, the path of constant total confinement and the path of radio frequency minimum correspond to the geometry of the atomic object confinement apparatus. In an example embodiment, the particular variable path ratio depends on both frequency of periodic voltage signals applied to radio frequency rails of the atomic object confinement apparatus and the particular axial frequency.

In an example embodiment, the multi-atomic object comprises a first atomic object of a first species having a first mass and a second atomic object of a second species having a second mass, the first mass is greater than the second mass.

In an example embodiment, the representative atomic object is one of (a) the first atomic object, (b) the second atomic object, (c) a reduced atomic object having physical properties determined based on reduced physical properties of two or more atomic objects of the multi-atomic object crystal, or (d) an average atomic object having physical properties determined based on average physical properties of the two or more atomic objects.

In an example embodiment, the quantum computer further comprises a manipulation source and the controller is further configured to control operation of the manipulation source to cause the manipulation source to generate and provide a sympathetic cooling beam such that the sympathetic cooling beams is incident on the multi-atomic object crystal while the multi-atomic object crystal traverses the junction.

In an example embodiment, the atomic object confinement apparatus is part of a quantum processor, the multi-atomic object crystal comprises a first atomic object used as a qubit atomic object of the quantum processor, and the multi-atomic object crystal comprises a second atomic object used as a sympathetic cooling atomic object.

In an example embodiment, order of atomic objects within the multi-atomic object crystal is changed as the multi-atomic object crystal traverses the transport path.

In an example embodiment, each leg of the two or more legs defines a one-dimensional portion of the atomic object confinement apparatus and the atomic object confinement apparatus is a multi-dimensional atomic object confinement apparatus.

In an example embodiment, the controlling voltage signals are generated based on a waveform series determined based on the combination of at least (a) the path of constant total confinement for the representative atomic object and (b) the path of radio frequency minimum for the representative atomic object, based on at least one of (a) the particular variable path ratio or (b) the particular variable axial frequency, the at least one of (a) the particular variable path ratio or (b) the particular variable axial frequency configured to minimize at least non-adiabatic excitation of the multi-atomic object as a result of traversing the transport path.

In an example embodiment, the waveform series defines the particular variable axial frequency and is stored in the memory of the controller and the controller is further configured to, responsive to determining that the multi-atomic object crystal is to be transported from the first leg to the second leg through the junction, accessing the waveform series from memory.

In an example embodiment, the waveform series is configured to cause the representative atomic object to traverse a path that is the combination of at least (a) the path of constant total confinement for the representative atomic object and (b) the path of radio frequency minimum for the representative atomic object.

In an example embodiment, the combination is a linear combination of (a) the path of constant total confinement for the representative atomic object, (b) the path of radio frequency minimum for the representative atomic object, (c) a path of minimal non-adiabatic excitation for a first atomic object of the multi-atomic object crystal, and (d) a path of minimal non-adiabatic excitation for a second atomic object of the multi-atomic object crystal.

According to yet another aspect, a computer program product is provided. In an example embodiment, the computer program product comprises a non-transitory, machine-readable storage medium storing executable instructions that, when executed with a processing device of a controller, cause the one or more driver controller elements to control the one or more voltage sources to cause generation of a time-dependent potential by applying controlling voltage signals to at least a portion of the plurality of electrodes. The atomic object confinement apparatus comprises a junction connecting a first leg of the atomic object confinement apparatus to at least a second leg of the atomic object confinement apparatus. The time-dependent potential is configured to generate a potential well that travels through the junction from the first leg to a second leg of the two or more legs of the atomic object confinement apparatus to cause the multi-atomic object crystal to traverse a transport path through the junction from the first leg to a second leg of the two or more legs of the atomic object confinement apparatus. The transport path is determined based at least in part on a combination of at least (a) a path of constant total confinement for a representative atomic object of the multi-atomic object crystal and (b) a path of radio frequency minimum for the representative atomic object of the multi-atomic object crystal. The combination of the path of constant total confinement and the path of radio frequency minimum is determined based on a particular variable path ratio.

In an example embodiment, the executable instructions are further configured to, when executed with the processing device of the controller, cause the controller to at least cause the controller to cause one or more driver controller elements of the controller to control one or more voltage sources in electrical communication with one or more respective electrodes of an atomic object confinement apparatus to cause the atomic object confinement apparatus to confine at least one multi-atomic object crystal in a first leg of the atomic object confinement apparatus; and cause the one or more driver controller elements to control the one or more voltage sources to cause transportation of the multi-atomic object crystal along the first leg to proximate the junction.

In an example embodiment, the time-dependent potential is configured to generate a potential well characterized by a particular variable axial frequency.

In an example embodiment, the path of constant total confinement and the path of radio frequency minimum correspond to the geometry of the atomic object confinement apparatus. In an example embodiment, the particular variable path ratio depends on both frequency of periodic voltage signals applied to radio frequency rails of the atomic object confinement apparatus and the particular axial frequency.

In an example embodiment, the multi-atomic object comprises a first atomic object of a first species having a first mass and a second atomic object of a second species having a second mass, the first mass is greater than the second mass.

In an example embodiment, the representative atomic object is one of (a) the first atomic object, (b) the second atomic object, (c) a reduced atomic object having physical properties determined based on reduced physical properties of two or more atomic objects of the multi-atomic object crystal, or (d) an average atomic object having physical properties determined based on average physical properties of the two or more atomic objects.

In an example embodiment, the executable instructions are further configured to, when executed with the processing device of the controller, cause the controller to control operation of a manipulation source to cause the manipulation source to generate and provide a sympathetic cooling beam such that the sympathetic cooling beams is incident on the multi-atomic object crystal while the multi-atomic object crystal traverses the junction.

In an example embodiment, the atomic object confinement apparatus is part of a quantum processor, the multi-atomic object crystal comprises a first atomic object used as a qubit atomic object of the quantum processor, and the multi-atomic object crystal comprises a second atomic object used as a sympathetic cooling atomic object.

In an example embodiment, order of atomic objects within the multi-atomic object crystal is changed as the multi-atomic object crystal traverses the transport path.

In an example embodiment, each leg of the two or more legs defines a one-dimensional portion of the atomic object confinement apparatus and the atomic object confinement apparatus is a multi-dimensional atomic object confinement apparatus.

In an example embodiment, the controlling voltage signals are generated based on a waveform series determined based on the combination of at least (a) the path of constant total confinement for the representative atomic object and (b) the path of radio frequency minimum for the representative atomic object, based on at least one of (a) the particular variable path ratio or (b) the particular variable axial frequency, the at least one of (a) the particular variable path ratio or (b) the particular variable axial frequency configured to minimize non-adiabatic excitation of the multi-atomic object as a result of traversing the transport path.

In an example embodiment, the waveform series defines the particular variable axial frequency and is stored in a memory accessible to the processing device of the controller and the executable instructions are further configured to, when executed with the processing device of the controller, cause the controller to, responsive to determining that the multi-atomic object crystal is to be transported from the first leg to the second leg through the junction, accessing the waveform series from memory.

In an example embodiment, the waveform series is configured to cause the representative atomic object to traverse a path that is the combination of at least (a) the path of constant total confinement for the representative atomic object and (b) the path of radio frequency minimum for the representative atomic object.

In an example embodiment, the combination is a linear combination of (a) the path of constant total confinement for the representative atomic object, (b) the path of radio frequency minimum for the representative atomic object, (c) a path of minimal non-adiabatic excitation for a first atomic object of the multi-atomic object crystal, and (d) a path of minimal non-adiabatic excitation for a second atomic object of the multi-atomic object crystal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1A provides a top view of a portion of an example atomic object confinement apparatus that may be used in an example embodiment.

FIG. 1B provides a zoomed in top view of the portion of the example atomic object confinement apparatus shown in FIG. 1A located within the dashed rectangle.

FIG. 2 provides a plot showing the path of constant total confinement, the path of radio frequency (RF) minimum, and an example crystal transport path of the present disclosure, in accordance with an example embodiment.

Figure 7:
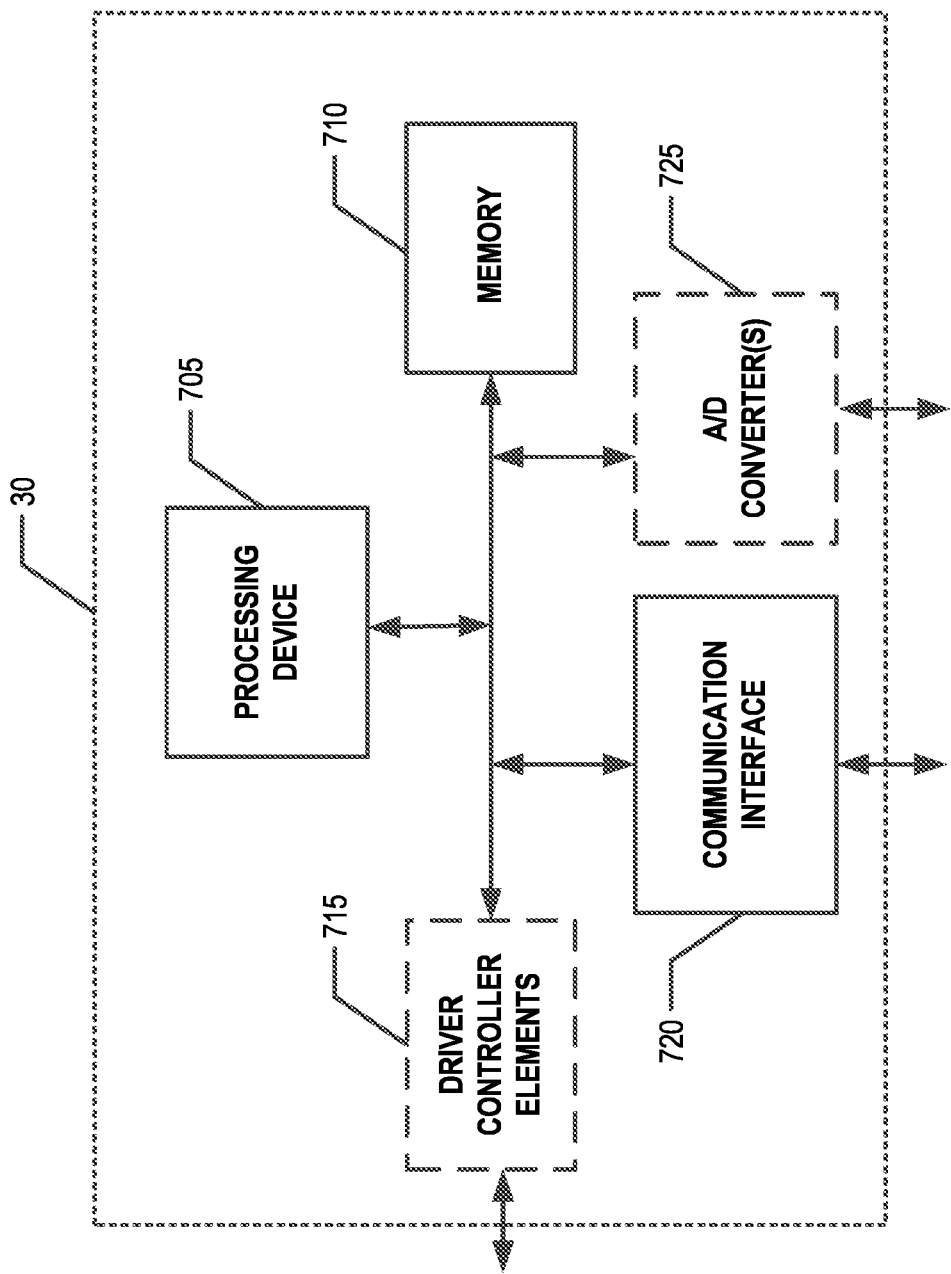

FIG. 7 provides a schematic diagram of an example controller of a quantum computer configured to perform one or more deterministic reshaping and/or reordering functions, according to various embodiments.

FIG. 8 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

In various embodiments, methods, apparatuses, systems, computer program products, and/or the like for transporting a multi-atomic object crystal through a junction of a multi-dimensional atomic object confinement apparatus. In various embodiments, the multi-atomic object crystal comprises two or more atomic objects that are physically associated with one another. In various embodiments, the two or more atomic objects are of two or more species of atomic objects. For example, in an example embodiment, a multi-atomic object crystal comprises a singly ionized Ytterbium atom and a singly ionized Barium atom. In an example embodiment, a multi-atomic object crystal comprises a qubit ion configured for use as a data qubit of a quantum processor and a sympathetic cooling atomic object configured for use in performing sympathetic cooling of the qubit ion. In an example embodiment, the multi-atomic object crystal comprises two ionic molecules (e.g., molecules that have a non-zero net electric charge). In various embodiments, a multi-atomic object crystal comprises three or more atomic objects. In various embodiments, an atomic object is an ionic atom, anionic molecule, and/or trappable and/or charged particle.

In various embodiments, the atomic object confinement apparatus is configured to confine a plurality of atomic objects, at least some of which are organized into multi-atomic object crystals. In various embodiments, the atomic object confinement apparatus is an ion trap. In various embodiments, the atomic object confinement apparatus is a two-dimensional or three-dimensional atomic object confinement apparatus. For example, the atomic object confinement apparatus is a two-dimensional surface ion trap or two-dimensional Paul trap, in an example embodiment. In various embodiments, the atomic objects are trapped and/or confined by the atomic object confinement apparatus for a variety of purposes, which may include mass spectrometry, research, and/or controlling quantum states of the trapped ions (e.g., as qubits of a quantum computer), for example.

In various embodiments, the multi-dimensional atomic object confinement apparatus comprises at least three legs which are connected to one another via at least one junction. For example, the ends of three or four legs of the multi-dimensional atomic object confinement apparatus are connected via a junction, in an example embodiment. In various embodiments, a leg of the atomic object confinement apparatus is a one-dimensional portion of the atomic object confinement apparatus. In particular, a leg of the atomic object defines a substantially one-dimensional confinement region within which atomic objects and/or multi-atomic object crystals may be confined.

In various embodiments, at least two legs which are joined by a junction define one-dimensional confinement regions that are, at least proximate the junction are transverse to one another. For example, a portion of a first leg that is proximate the end of the first leg that abuts and/or joins at a first junction is generally in a first direction and a portion of a second leg that is proximate that end of the second leg that abuts and/or joins at the first junction is generally in a second direction. The first and second directions are transverse to one another (e.g., not parallel or anti-parallel to one another). In an example embodiment, a portion of a third leg that is proximate the end of the third leg that abuts and/or joins at the first junction is generally in a third direction. The third direction is transverse to the first direction, in an example embodiment. The third direction is parallel to the first direction, in an example embodiment.

In various embodiments, the atomic object confinement apparatus comprises one or more radio frequency (RF) electrodes, referred to as RF rails herein. A periodic voltage signal (e.g., having radio frequency periodicity) is applied to the RF rail(s) to generate a confining or trapping pseudopotential. In various embodiments, the atomic object confinement apparatus further comprises a plurality of trapping and/or transport (TT) electrodes. In various embodiments, the plurality of TT electrodes are organized into sequences of TT electrodes that generally extend along and/or substantially parallel to the one or more RF rails. The controlling voltage signals are applied to the TT electrodes to generate electric potentials configured to precisely position and/or transport atomic objects confined and/or trapped within the atomic object confinement apparatus. For example, the controlling voltage signals applied to the TT electrodes generate one dimensional potential wells that can be used to position an atomic object at a particular location within the atomic object confinement apparatus and/or transport an atomic object from a first position within the atomic object confinement apparatus to a second position within the atomic object confinement apparatus. The controlling voltage signals applied to the TT electrodes are substantially direct current (DC) voltages that may change at a rate that is substantially slower (e.g., slower by at least an order of magnitude) that the rate of change of the periodic voltage signal(s) applied to the RF rail(s).

In various embodiments, the pseudopotential experienced by an atomic object confined thereby is mass dependent. However, within the legs of the atomic object confinement apparatus, the pseudopotential has well-behaved linear properties and the pseudopotential comprises a pseudopotential null that extends along the respective substantially one-dimensional confinement region defined by the respective leg. In particular, the pseudopotential null of a leg defines the atomic object transport path along that leg. For example, the time t dependent electric field generated by the application of the periodic voltage signal to the RF rails is of the form $E(\vec{r}, t) = E_0(\vec{r}) \cos(\Omega t)$, where $\vec{r}$ is a position vector, $E_0(\vec{r})$ describes the amplitude of the electric field as a function of position $\vec{r}$, and $\Omega$ is the frequency of the periodic voltage signal. At any position $\vec{r}_n$ along the pseudopotential null, $E_0(\vec{r}_n)=0$.

As used herein, the pseudopotential has well-behaved linear properties when, in a leg and distant from the junction, the pseudopotential looks similar to the pseudopotential that would result from two infinite, parallel RF rails. In particular, the pseudopotential in a central portion of a leg defines a linear pseudopotential null (e.g., a line of RF minimum), and the confinement from the pseudopotential is radially symmetric about the linear pseudopotential null in the central portion of the leg. This pseudopotential configuration (e.g., the pseudopotential having well-behaved linear properties in respective central portions of the legs) allows for the performance of operations that are useful in using the atomic object confinement apparatus as part of a quantum processor, such as the performance of logical gates, cooling, and various transport operations, including splitting/combining multi-atomic object crystals.

The potential contribution generated by the application of controlling voltage signals to the TT electrodes do include a mass dependence. For example, a first atomic object of a first species has a first mass and a first charge and a second atomic object of a second species has a second mass that is greater than the first mass and a second charge that is equal to the first charge. The first atomic object is affected more strongly by the pseudopotential than the second atomic object. However, the first atomic object and the second atomic object are affected by the electrical potential generated by the application of controlling voltage signals to the TT electrodes with the same strength.

Proximate and/or within junctions of the atomic object confinement apparatus, the well-behaved linear properties of the pseudopotential are disrupted. For example, within a junction, the pseudopotential does not have a pseudopotential null that is within the confinement and/or trapping region of the atomic object confinement apparatus. In other words, there is not pseudopotential null through the junction along which confined and/or trapped atomic objects can be transported. Thus, as an atomic object is transported through a junction, the atomic object experiences a non-zero, mass dependent pseudopotential. When a single atomic object is being transported through the junction at a time, the non-zero pseudopotential can be compensated for through the application of appropriate controlling voltage signals to the TT electrodes. However, when a multi-atomic object crystal (e.g., two or more atomic objects, possibly including two or more species of atomic objects) is transported through a junction, the mass differences between the atomic objects of the multi-atomic object crystal lead to significant technical problems in compensating for the non-zero pseudopotential.

Due to the non-zero pseudopotential experienced by an atomic object being transported through a junction, it may be desired to transport the atomic object along a local minimum of the pseudopotential, referred herein as the RF minimum, to minimize the effect of the pseudopotential experienced by the atomic object. However, the total confinement (e.g., the confinement provided by the sum of the electric field generated by the application of the periodic voltage signals to the RF rails and the application of the controlling voltage signals to the TT electrodes) is quite low near the center of the junction along the path of RF minimum through the junction. In other words, the potential well formed by both the periodic electric field generated by the RF rails and the more slowly evolving electric field generated by the TT electrodes is quite shallow near the center of the junction along the path of RF minimum through the junction. Thus, transporting an atomic object through the junction along the path of RF minimum may result in the atomic object becoming highly exited by small stray electric fields (e.g., generated by electronic noise in the system), which may lead to atomic object loss.

As a result of the low potential well depth at various points along the path of RF minimum through a junction, single atomic object transport through a junction is sometimes performed by transporting the single atomic object along a path of constant total confinement through the junction. The path of constant total confinement is a path through the junction where the total confinement at each point along the path is approximately the same (e.g., constant), for a particular atomic object. The value of the total confinement is taken from the total confinement value at a location in a portion of a leg where there is an RF null. Thus, the path of RF minimum and the path of constant total confinement will both start along the RF null of a first leg and end at the RF null of a second leg. For a single atomic object, the path of constant total confinement through the junction is readily obtained from analysis of the fields and the generation of trapping potentials for single atomic objects. Typically the path of constant total confinement is at a lower atomic object height (closer to the surface of the atomic object confinement apparatus) near the junction center (e.g., compared to the path of RF minimum). However, it is possible to design atomic object confinement apparatuses so that the path of constant total confinement is at a nearly constant height.

As noted above, the pseudopotential experienced by atomic objects confined within the atomic object confinement apparatus is proportional to the inverse of the mass the respective atomic object. When transporting a multi-atomic object crystal that includes atomic objects of different mass (e.g., different species of atomic objects), there does not exist a path for the multi-atomic object crystal through the junction that satisfies the constraints applied for the path of RF minimum and/or the path of constant total confinement. As a result, attempts to transport multi-atomic object crystals through a junction generally result in atomic object loss (e.g., at least one of the atomic objects is no longer trapped or confined by the atomic object confinement apparatus). Thus, significant technical difficulties exist for transport multi-atomic object crystals through a junction, especially when the multi-atomic object crystals include multiple (e.g., two or more) species of atomic objects.

Embodiments of the present invention provide technical solutions to the technical problems of transporting multi-atomic object crystals through a junction of an atomic object confinement apparatus. For example, various embodiments provide techniques for determining waveform series that, when controlling voltage signals generated based on the waveform series are applied to TT electrodes proximate a junction, cause a multi-atomic object crystal to be transported through the junction. Various embodiments provides techniques for applying such waveform series to transport multi-atomic object crystals through a junction of an atomic object confinement apparatus. In various embodiments, a multi-atomic object crystal transported through a junction of the atomic object confinement apparatus is a multi-species multi-atomic object crystal. For example, in an example embodiment, the multi-atomic object crystal comprises and/ or consists of (a) a first atomic object of a first species and having a first mass and (b) a second atomic object of a second species and having a second mass. The first mass and the second mass are different.

In an example embodiment, the multi-atomic object crystals and the atomic object confinement apparatus confining the multi-atomic object crystals are part of a quantum processor of a quantum computer. In an example embodiment, a first atomic object of the multi-atomic object crystal is a qubit atomic object configured for use as a data qubit of a quantum processor and a second atomic object of the multi-atomic object crystal a sympathetic cooling atomic object configured for use in performing sympathetic cooling of the qubit atomic object.

Example Atomic Object Confinement Apparatus

Figure 1:
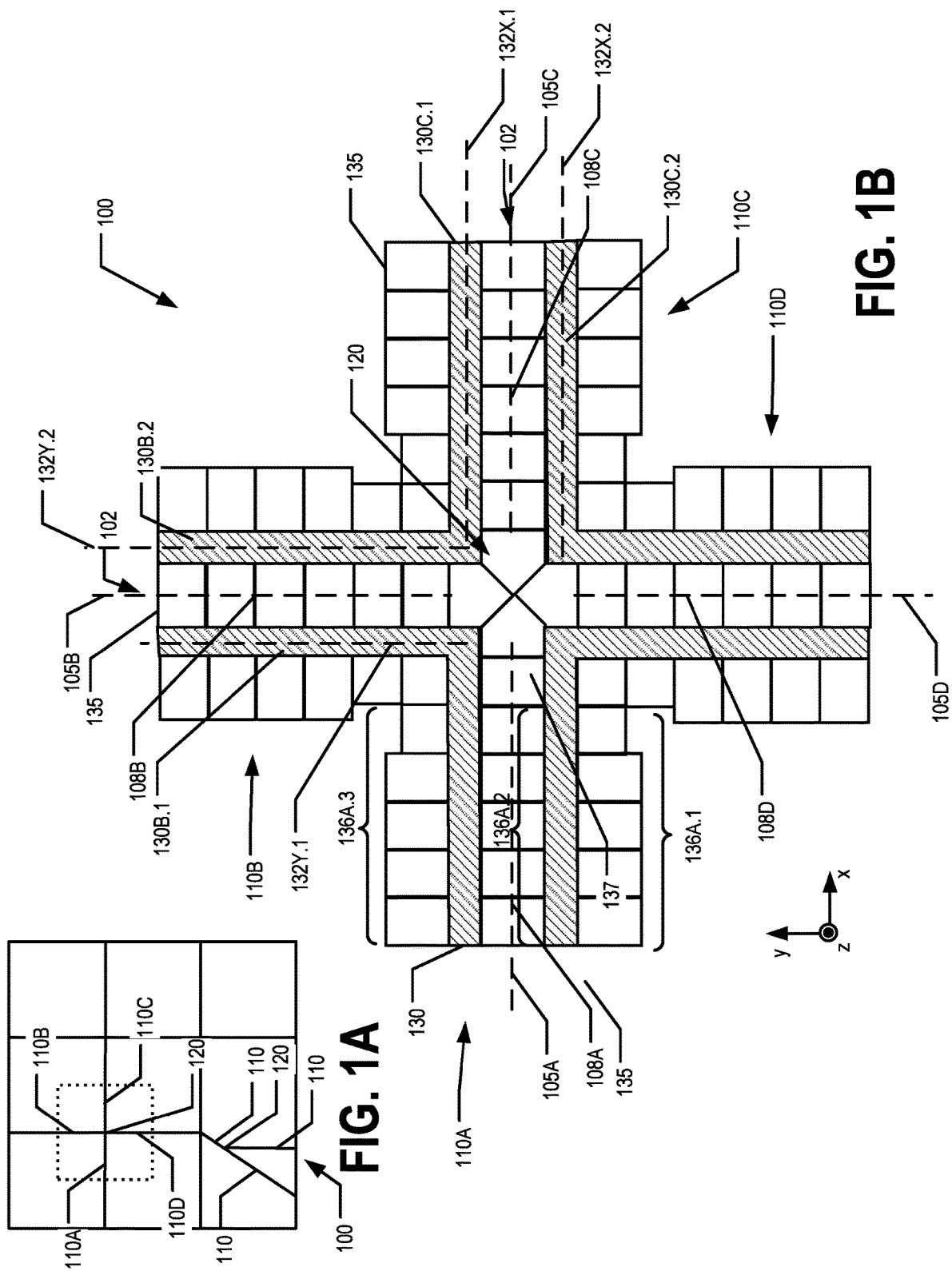

FIG. 1A provides a top schematic view of a portion of an example atomic object confinement apparatus 100. In an example embodiment, the atomic object confinement apparatus 100 is a multi-dimensional (e.g., two or three-dimensional) surface ion trap, surface Paul trap, and/or the like configured to trap a plurality of ions therein. The atomic object confinement apparatus 100 comprises a plurality of legs 110 and a plurality of junctions 120. Each leg 110 of the atomic object confinement apparatus 100 extends a respective length between two respective ends. In general (e.g., other than possibly the edges of atomic object confinement apparatus), each end of each leg 110 is connected to at least one other leg 110 by a junction 120. FIG. 1B zooms in on one example junction 120 of the atomic object confinement apparatus that is formed by the intersection of the four legs 110A, 110B, 110C, 110D and/or that connects each of legs 110A, 110B, 110C, 110D to one another via a respective end thereof. In particular, FIG. 1B illustrates the portions of legs 110A, 110B, 110C, 110D that are proximate the end of the respective legs 110 that join and/or meet at the junction 120. In general, a leg 110 of the atomic object confinement apparatus 100 is a one-dimensional portion of the atomic object confinement apparatus 100. In particular, a leg 110 of the atomic object defines a substantially one-dimensional confinement region within which atomic objects and/or multi-atomic object crystals may be confined. In general, a junction 120 is formed by two or more legs 110 meeting, joining, and/or abutting. At least two legs 110 of the two or more legs define one-dimensional confinement regions that are, at least proximate the junction are transverse to one another. For example, leg 110A is transverse to legs 110B and 110D, at least proximate the junction 120.

In an example embodiment, the atomic object confinement apparatus 100 is fabricated as part of an ion trap chip and/or part of an ion trap apparatus and/or package. In an example embodiment, the atomic object confinement apparatus 100 is at least partially defined by a number of radio frequency (RF) rails 130. In various embodiments, the atomic object confinement apparatus 100 is at least partially defined by a number of sequences of trapping and/or transport (TT) electrodes 135. In various embodiments, a variety of TT electrode geometries, placements, layouts, and/or the like may be used. In various embodiments, the upper surface of the atomic object confinement apparatus 100 has a planarized topology. For example, the upper surface of each RF rail 130 of the number of RF rails and the upper surface of each TT electrode 135 of the number of sequences of TT electrodes may be substantially coplanar. In an example embodiment, the surface of the atomic object confinement apparatus 100 is not planar and a plane is defined from which the height of the atomic objects above the "surface" of the atomic object confinement apparatus 100 is measured.

In various embodiments, the legs 110 of the atomic object confinement apparatus 100 comprises and/or is at least partially defined by a number of RF rails 130. In an example embodiment, a leg 110 of the atomic object confinement apparatus 100 are formed with substantially parallel longitudinal axes 132. For example, leg 110C is at least partially defined by two RF rails 130C which have substantially parallel longitudinal axes 132X. For example, the RF rails 130C defining leg 110C are substantially parallel such that a distance between the RF rails 130C defining leg 110C is approximately constant along the length of the RF rails 130C. Similarly, the leg 110B is at least partially defined by two RF rails 130B.1, 130B.2 which have substantially parallel longitudinal axes 132Y.1, 132Y.2. For example, the RF rails 130B.1, 130B.2 defining leg 110B are substantially parallel such that a distance between the RF rails 130B.1 and 130B.2 defining leg 110B is approximately constant along the length of the RF rails 130B.1, 130B.2. The substantially parallel longitudinal axes 132Y.1, 132Y.2 of the RF rails 130B.1, 130B.2 at least partially defining leg 110B are transverse to the substantially parallel longitudinal axes 132X.1, 132X.2 of the RF rails 130C.1, 130C.2 at least partially defining leg 110C. For example, the angle between the longitudinal axes 132Y.1, 132Y.2 of the RF rails 130B.1, 130B.2 at least partially defining leg 110B and the longitudinal axes 132X.1, 132X.2 of the RF rails 130C.1, 130C.2 at least partially defining leg 110C is greater than zero degrees and less than 180 degrees (e.g., in the range of 15 degrees to 165 degrees, 25 degrees to 155 degrees, and/or the like, 45 degrees to 135 degrees, 60 degrees to 120 degrees, and/or the like). For example, in the illustrated embodiment, the angle between the longitudinal axes 132Y.1, 132Y.2 of the RF rails 130B.1, 130B.2 at least partially defining leg 110B and the longitudinal axes 132X.1, 132X.2 of the RF rails 130C.1, 130C.2 at least partially defining leg 110C is approximately 90 degrees. In an example embodiment, the upper surfaces of the RF rails 130 may be substantially flush with the upper surface of the atomic object confinement apparatus 100. FIG. 1B illustrates an atomic object confinement apparatus 100 with each leg 110 at least partially defined by a pair (e.g., two) substantially parallel RF rails 130. In other embodiments, various configurations of one or more RF rails 130 may be used to define the legs 110 of the atomic object confinement apparatus 100. In an example embodiment, a first set of one or more legs of the atomic object confinement apparatus 100 are at least partially defined by a different configuration of RF rails 135 than a second set of one or more legs of the atomic object confinement apparatus 100.

In various embodiments, two adjacent RF rails 130 (e.g., the two RF rails 130C.1, 130C.2 that at least partially define leg 110C or the two RF rails 130B.1, 130B.2 that at least partially define 110B) may be separated (e.g., insulated) from one another by a longitudinal gap 102. For example, the longitudinal gap may define (in one or two dimensions) the confinement channel or region of the atomic object confinement apparatus 100 in which one or more atomic objects may be confined and/or trapped at various locations within the atomic object confinement apparatus. In various embodiments, the longitudinal gap 102 defined thereby may extend substantially parallel to the longitudinal axes (e.g., 132X.1, 132X.2, 132Y.1, 132Y.2) of the adjacent RF rails 130. In an example embodiment, the longitudinal gap 102 may be at least partially filled with an insulating material (e.g., a dielectric material). In various embodiments, the dielectric material may be silicon dioxide (e.g., formed through thermal oxidation) and/or other dielectric and/or insulating material. In various embodiments, the longitudinal gap 102 has a height (e.g., in the z-direction as illustrated in FIG. 1B) of approximately 40 μm to 500 μm. In various embodiments, one or more sequences of TT electrodes 135 is disposed and/or formed within the longitudinal gap 102.

In various embodiments, the atomic object confinement apparatus 100 (and/or legs 110 and/or junctions 120 thereof) may be at least partially defined by a number of sequences of TT electrodes 135. Each sequence of TT electrodes 135 that is associated with and/or at least partially defines a leg 110 is formed to extend substantially parallel to the one or more the RF rails 130 that at least partially define the respective 110. For example, the three sequences of TT electrodes 136A.1, 136A.2, and 136A.3 at least partially define the portion of leg 110A illustrated in FIG. 1B. Each of the three sequences of TT electrodes 136A.1, 136A.2, and 136A.3 comprise a plurality of TT electrodes 135. In the illustrated embodiment, the number of sequences of TT electrodes 136A.1, 136A.2, 136A.3 extend substantially parallel to the x-axis shown in FIG. 1B, which is substantially parallel to the longitudinal axes of the RF rails 130 that at least partially define leg 110A. In various embodiments, the number of sequences of TT electrodes 136 (e.g., 136A.1, 136A.2, 136A.3) that at least partially define each leg 110 comprises two, three, four, and/or another number of sequences of TT electrodes. In an example embodiment, the atomic object confinement apparatus 100 comprises a plurality of number of sequences of TT electrodes 136, with each number of sequences of TT electrodes at least partially defining a leg 110 of the atomic object confinement apparatus 100. In some embodiments, each of the TT electrodes 135 are formed with substantially coplanar upper surfaces that are substantially coplanar with the upper surfaces of the RF rails 130.

In an example embodiment, a transverse gap may exist between neighboring and/or adjacent TT electrodes 135. In an example embodiment, the transverse gap may be empty space and/or at least partially filled with a dielectric material to prevent electrical communication between neighboring and/or adjacent electrodes 135. In an example embodiment, the transverse gap between neighboring and/or adjacent electrodes 135 may be in the range of approximately 1-10 μm.

In an example embodiment, a longitudinal gap exists between a sequence of TT electrodes 136 and a neighboring and/or adjacent RF rail 130. In an example embodiment, the longitudinal gap may be at least partially filled with a dielectric and/or insulating material to prevent electrical communication between TT electrodes 135 of the sequence of electrodes 136 and the RF rail 130. In an example embodiment, the longitudinal gap between neighboring and/or adjacent electrodes may be in the range of approximately 1-10 μm.

In an example embodiment a number (e.g., pair) of RF rails 130 may be formed between a first sequence of TT electrodes 136A.1 and a third sequence of TT electrodes 136A.3 with a second sequence of TT electrodes 136A.2 extending along the longitudinal channel 102 between the RF rails 130. For example, each sequence of TT electrodes 136 of a particular leg 110 may extend in a direction substantially parallel to the longitudinal axes 132 of the RF rails 130 of the particular leg 110. In various embodiments, the upper surfaces of the TT electrodes 135 are substantially coplanar with the upper surfaces of the RF rails 130.

In various embodiments, periodic voltage signals (e.g., voltage signals having a radio frequency periodicity) may be applied to the RF rails 130 to generate an electric and/or magnetic field that acts to maintain an atomic object and/or multi-atomic object crystal confined and/or trapped within the atomic object confinement apparatus 100. For example, the RF rails 130 that at least in part define a particular leg generate an electric pseudopotential that confines and/or traps atomic objects within the particular leg in directions transverse to the corresponding one-dimensional portion of the atomic object confinement apparatus 100. For example, the RF rails 130C.1, 130C.2 are configured to, when a periodic voltage signal is applied thereto, generate a pseudopotential that confines and/or traps atomic objects in the y- and z-directions, which are the directions transverse to the leg axis 105C, as illustrated in FIG. 1B. For example, the RF null 108C along leg 110C defines a transport path along leg 110C along which atomic objects and/or multi-atomic object crystals can be transported along the leg 110C The RF null 108C is substantially parallel to the leg axis 105C, in the illustrated embodiment. Similarly, the RF nulls 108A, 108B, 108D of respective legs 110A, 110B, 110D are substantially parallel to the respective leg axis 105A, 105B, 105D. In various embodiments, the TT electrodes 135 are configured to have controlling voltage signals applied thereto such that the TT electrodes 135 generate a time-dependent electric potential field that causes the atomic objects and/or multi-atomic object crystals along the transport path (e.g., substantially parallel to the RF null 108C) for the leg 110C. For example, the electrical and/or magnetic field generated at least in part by controlling voltage signals applied to the TT electrodes 135 of a particular leg 110 of the sequences of TT electrodes 114 may trap at least one atomic object and/or multi-atomic object crystal in a potential well above the upper surface of the second sequence of TT electrodes (e.g., 136A.2 for leg 110A) and/or the longitudinal gap 102 of the respective leg 110. Additionally, the controlling voltage signals applied to the electrodes 135 may cause atomic objects and/or multi-atomic object crystals confined and/or trapped within the potential well above the upper surface of the second sequence of TT electrodes and/or the longitudinal gap 102 to traverse trajectories that substantially follow and/or are along the RF null 108 for the corresponding leg 110, when the atomic objects and/or multi-atomic object crystals are located within a leg.

In various embodiments, TT electrodes 135 are also disposed within the junction. In various embodiments, TT electrodes 135 disposed proximate a junction 120 are configured such that when controlling voltage signals are applied to the TT electrodes 135 proximate the junction 120, the TT electrodes 135 generate an electric and/or magnetic field configured to cause atomic objects and/or multi-atomic object crystals (including multi-atomic object crystals that include two or more atomic object species) to be transported along a transport path through the junction 120. In various embodiments, the transport path through the junction that is traversed by the multi-atomic object crystal is a weighted average and/or linear combination of the path of RF minimum and/or path of constant total confinement for one and/or a combination of the atomic objects of the multi-atomic object crystal.

In various embodiments, the controlling voltage signals applied to the TT electrodes 135 and the periodic voltage signals applied to the RF rails 130 are controlled by one or more connected devices (e.g., a controller 30 as shown in FIG. 7 and/or the like) via leads. For example, depending on the positive or negative charge on the at least one atomic object, the amplitude of the controlling voltage signals may be raised or lowered for TT electrodes 135 in the vicinity of a particular atomic object and/or multi-atomic object crystal to cause the particular ion to traverse a desired trajectory. For example, a controller 30 may control a voltage source 50 and/or other voltage driver to cause the voltage source 50 and/or driver to apply controlling voltage signals to the TT electrodes 135 to generate a time-dependent electric potential (e.g., an electric potential that evolves with time) that causes the atomic objects and/or multi-atomic object crystals within the atomic object confinement apparatus 100 to be transported along prescribed transport paths.

Depending on such factors as the charge on the at least one atomic object and/or atomic objects of the multi-atomic object crystal and/or the shape and/or magnitude of the combined electrical and/or magnetic fields (e.g., generated via application of the periodic voltage signals to the RF rails 130 and the controlling voltage signals to the TT electrodes 135), the atomic objects can be stabilized at a particular distance (e.g., approximately 20 μm to approximately 200 μm) above an upper surface of the atomic object confinement apparatus 100 (e.g., the coplanar upper surface of the TT electrodes 135 and RF rails 130). To further contribute to controlling the transit of atomic objects and/or multi-atomic object crystals along desired trajectories, the atomic object confinement apparatus 100 may be operated within a cryogenic and/or vacuum chamber capable of cooling the atomic object confinement apparatus to a temperature of less than 124 Kelvin (e.g., less than 100 Kelvin, less than 50 Kelvin, less than 10 Kelvin, less than 5 Kelvin, and/or the like), in various embodiments.

As should be understood, a portion of the atomic object confinement apparatus 100 is shown in FIG. 1B. In various embodiments, the atomic object confinement apparatus 100 comprises a plurality of junctions 120 that each connect at least three legs of the atomic object confinement apparatus 100. For example, in an example embodiment, the atomic object confinement apparatus 100 is a periodic array of legs 110 and/or junctions 120. As should be understood, junctions 120 of various embodiments may have a variety of topologies, connect various numbers of legs (e.g., three or more legs, at least two legs that define directions that are transverse to one another, and/or the like).

Example Method for Determining a Waveform Series for Transporting a Multi-Atomic Object Crystal Through a Junction In various embodiments, a computing entity 10 and/or a controller 30 (e.g., see FIG. 7) may determine a waveform series for us in transporting a multi-atomic object crystal through a junction along a transport path. In various embodiments, a waveform series is series of voltages to be applied to one or more TT electrodes 135 to cause a multi-atomic object crystal to traverse a junction 120 from a first leg 110 to a second leg 110. For example, the waveform series causes the multi-atomic object crystal to traverse a transport path through the junction from a start position disposed on the first leg 110 (and proximate the junction) at a start time to an end position disposed on the second leg 110 (and proximate the junction) at an end time. In various scenarios, the first leg 110 and the second leg 110 have leg axes 105, at least proximate the junction 120, that are substantially parallel. For example, a multi-atomic object crystal may be transported from leg 110A to leg 110C, or vice versa, and/or from leg 110B to leg 110D, or vice versa. In various scenarios, the first leg 110 and the second leg 110 have leg axes, at least proximate the junction 120, that are transverse. For example, a multi-atomic object crystal may be transported from leg 110A to leg 110B or 110D, or vice versa, and/or from leg 110C to leg 110B or 110D, or vice versa.

In various embodiments, the transport path through the junction 120 is a weighted average and/or linear combination of the path of RF minimum and/or the path of constant total confinement from a position along the RF null 108 of the first leg 110 to a position along the RF null 108 of the second leg 110. For example, when the multi-atomic object crystal is being transported through the junction 120 from the leg 110A to leg 110B (leg 110C), the transport path through the junction 120 is a weighted average and/or linear combination of the path of RF minimum and the path of constant total confinement from a point along the RF null 108A of leg 110A to a point along the RF null 108B (108C) of leg 110B (110C).

Figure 2:
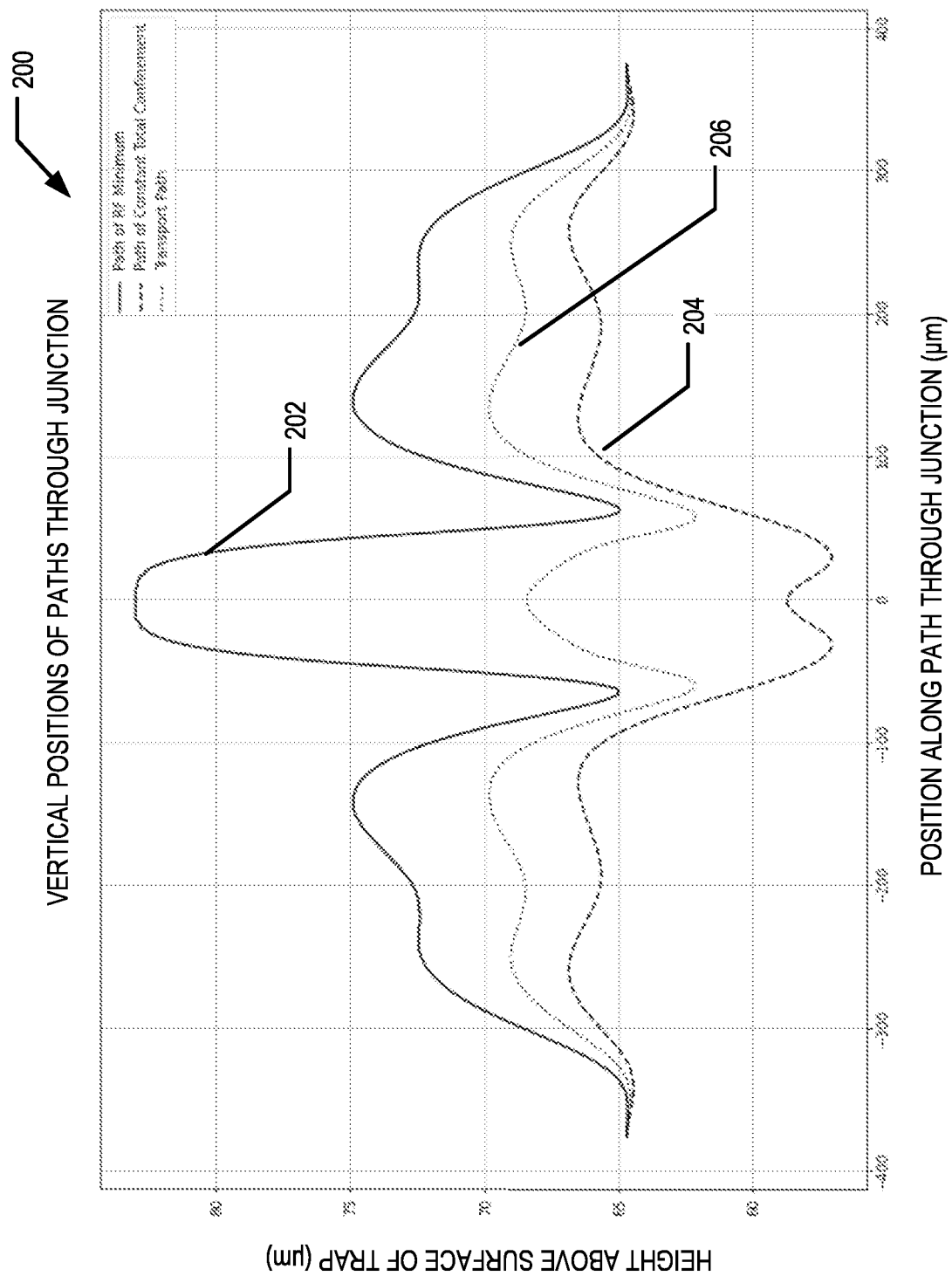

For example, FIG. 2 provides a plot 200 that illustrates the height above the surface of atomic object confinement apparatus 100 as a function of position along a path through the junction 120. The path of RF minimum 202, the path of constant total confinement 204, and an example transport path 206 are illustrated. As can be seen from the plot 200, the path of RF minimum 202 is generally further from the surface of the atomic object confinement apparatus 100 than the path of constant total confinement 204. The transport path 206, being an weighted average and/or linear combination of the path of RF minimum 202 and the path of constant total confinement 204 is between the path of RF minimum 202 and the path of constant total confinement 204.

Figure 3:
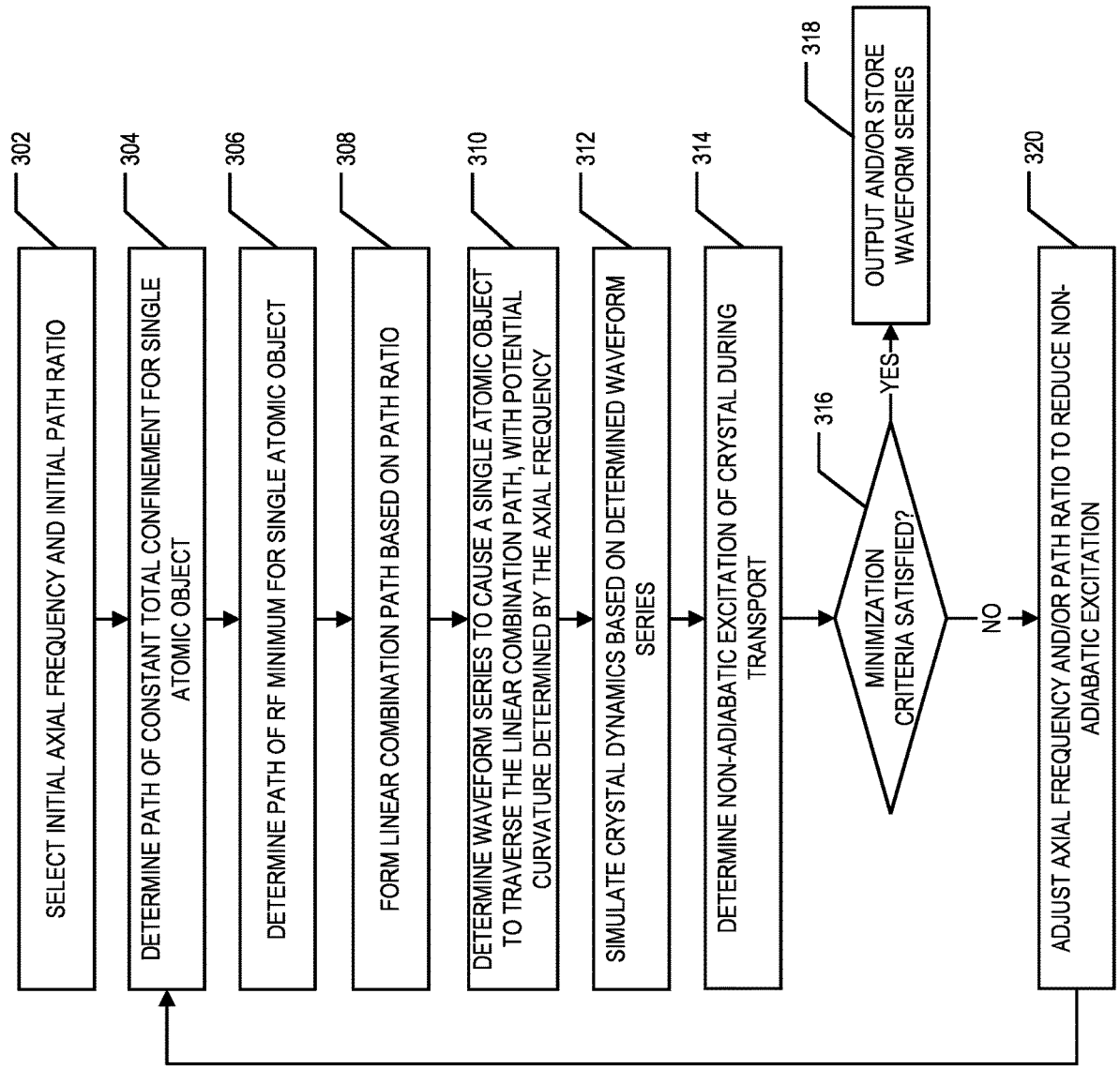
FIG. 3 is a flowchart of various processes, procedures, and/or operations that may be performed, for example, by a computing entity or a controller of the atomic object confinement apparatus, to determine a crystal transport waveform series, in accordance with an example embodiment.

FIG. 3 provides a flowchart that illustrating processes, procedures, operations, and/or the like for determining a waveform series for use in transporting a multi-atomic object crystal (e.g., a multi-atomic object crystal comprising atomic objects of at least two atomic object species) through a junction 120 on a corresponding transport path. In various embodiments, the waveform series is determined by a program or application operating on a computing entity 10, via one or more hardware components in electrical and/or optical communication with the atomic object confinement apparatus (e.g., the controller 30), and/or the like.

Starting at step/operation 302, an initial axial frequency and initial path ratio are selected and/or determined. In an example embodiment, a computing entity 10 and/or controller 30 selects and/or determines an initial axial frequency and initial path ratio. For example, the computing entity 10 may comprise means, such as processing device 808, memory 822, 824, keypad 818, and/or the like (see FIG. 8), for selecting and/or determining an initial axial frequency and initial path ratio. For example, the controller 30 may comprise means, such as processing device 705, memory 710, communication interface 720, and/or the like (see FIG. 7), for selecting and/or determining an initial axial frequency and initial path ratio. In an example embodiment, the initial path ratio is selected from the range 0 to 1, inclusive.

In various embodiments, the axial frequency ω describes a frequency of oscillations of a single atomic object in a potential well along the length of a leg of the atomic object confinement apparatus. The total electrical potential (e.g., generated by application of controlling voltage signals to the TT electrodes and periodic voltage signals to the RF rails) includes potential wells or minima. When an atomic object is located near the center of one of these potentials wells, the atomic object acts like a three-dimensional harmonic oscillator. The frequency of oscillations in a direction that is substantially parallel to the RF rails at the location of the potential well is referred to herein as the axial frequency. In various embodiments, the controlling voltage signals applied to the TT electrodes are configured to control the curvature (e.g., second-order spatial derivative in the axial direction) of the generated potential well such that an atomic object within the potential well oscillates with a particular and/or controlled axial frequency. In various embodiments, an acceptable or allowed range of axial frequencies is defined based on the geometry of the atomic object confinement apparatus 100 and/or a leg thereof and constraints regarding maintaining the atomic objects and/or multi-atomic object crystals confined and/or trapped within the atomic object confinement apparatus.

In various embodiments, the selected axial frequency is implemented by controlling various aspects of the potential well generated through application of the controlling voltage signals to the TT electrodes. For example, some example aspects of the potential well that are controlled in order to implement the selected axial frequency include the depth of the potential well, the width of the potential well in the axial direction, a curvature of the potential well in the axial direction, and/or the like.

In various embodiments, the path ratio describes the weighted average and/or linear combination of the path of RF minimum and the path of constant total confinement used to generate the transport path. For example, the path ratio may be written as $\alpha/\beta$, where the transport path 206 is equal to $\alpha$ times the path of RF minimum 202 and $\beta$ times the path of the constant total confinement 204 (divided by $\alpha+\beta$). In various embodiments, both $\alpha$ and $\beta$ are greater than zero. In an example embodiment, the initial path ratio is selected to be 1.0.

At step/operation 304, the path of constant total confinement for one atomic object for a fixed RF rail geometry and pseudopotential strength is determined. For example, the computing entity 10 and/or controller 30 determines the path of constant total confinement for a single atomic object. For example, the computing entity 10 may comprise means, such as processing device 808, memory 822, 824, and/or the like, for determining the path of constant total confinement for one atomic object. For example, the controller 30 may comprise means, such as processing device 705, memory 710, communication interface 720, and/or the like, for determining the path of constant total confinement for one atomic object. In various embodiments, the path of constant total confinement is determined based on a given the geometry of the atomic object confinement apparatus and/or the particular junction 120. For example, the path of constant total confinement is determined based on the fixed RF rail geometry and the pseudopotential strength generated by applying the periodic voltage signals to the RF rails.

In various embodiments, the path of constant total confinement is determined for a representative atomic object of multi-atomic object crystal. In an example embodiment, the representative atomic object is the atomic object of the multi-atomic object crystal having the greatest mass (e.g., the heaviest atomic object of the multi-atomic object crystal). In an example embodiment, the representative atomic object is the atomic object of the multi-atomic object crystal that has the least mass. In example embodiment, the representative atomic object is an average atomic object that has properties that are determined based on the average (e.g., mean, median and/or mode) properties of the atomic objects of the multi-atomic object crystal (e.g., average mass, average charge, and/or the like). In an example embodiment, the representative atomic object is a reduced atomic object that has properties that are determined based on the reduced properties of the atomic objects of the multi-atomic object crystal (e.g., reduced mass, reduced charge, and/or the like). In various embodiments, various other (virtual and/or simulated) atomic objects that are assigned physical properties based on corresponding physical properties of one or more atomic objects of the multi-atomic object crystal may be used as the representative atomic object. As should be understood the reduced mass of a multi-atomic object crystal with the $i^{th}$ atomic object of the multi-atomic object crystal having mass $m_i$ is determined by $$1/\sum_i \frac{1}{m_i}.$$

At step/operation 306, the path of RF minimum for one atomic object for a fixed RF rail geometry and pseudopotential strength is determined. For example, the computing entity 10 and/or controller 30 determines the path of RF minimum for the representative atomic object. For example, the computing entity 10 may comprise means, such as processing device 808, memory 822, 824, and/or the like, for determining the path of RF minimum for the representative atomic object. For example, the controller 30 may comprise means, such as processing device 705, memory 710, communication interface 720, and/or the like, for determining the path of RF minimum for the representative atomic object. In various embodiments, the path of RF minimum is determined based on a given the geometry of the atomic object confinement apparatus and/or the particular junction 120. For example, the path of RF minimum is determined based on the fixed RF rail geometry and the pseudopotential strength generated by applying the periodic voltage signals to the RF rails. In various embodiments, the path of RF minimum is determined for the same representative atomic object of multi-atomic object crystal as used to determine the path of constant total confinement.

At step/operation 308, a linear combination path is generated and/or formed. In various embodiments, the linear combination path is generated and/or formed by determining a weighted average and/or linear combination of the path of RF minimum for one atomic object and the path of constant total confinement for one atomic object is generated and/or formed based on the path ratio. For example, the computing entity 10 and/or controller 30 determines a linear combination path based on the path of RF minimum, the path of constant total confinement, and the path ratio. For example, the computing entity 10 may comprise means, such as processing device 808, memory 822, 824, and/or the like, for determining a linear combination path based on the path of RF minimum, the path of constant total confinement, and the path ratio. For example, the controller 30 may comprise means, such as processing device 705, memory 710, communication interface 720, and/or the like, for determining a linear combination path based on the path of RF minimum, the path of constant total confinement, and the path ratio. For example, in an example embodiment, the path of RF minimum is described by a sequence of positions $\vec{r}_m(t)$, where the variable t indexes the sequences of positions. Similarly, the path of constant total confinement is described by sequence of positions $\vec{r}_{ctc}(t)$, which is indexed by the same variable t. The linear combination path is described by a sequence of positions $\vec{r}_{lc}(t)$, which is also indexed by the variable t, such that $$\vec{r}_{lc}(t) = \frac{\alpha \vec{r}_m(t) + \beta \vec{r}_{ctc}(t)}{\alpha + \beta}.$$

At step/operation 310, a waveform series configured to cause the representative atomic object and/or a selected atomic object from the multi-atomic object crystal to traverse the linear combination path through the junction 120, while the well has the required curvature to give a selected and/or determined axial trap frequency, is determined. For example, the computing entity 10 and/or controller 30 determines a waveform series configured to cause the representative atomic object and/or the selected atomic object from the multi-atomic object crystal to traverse the linear combination path through the junction 120. For example, the computing entity 10 may comprise means, such as processing device 808, memory 822, 824, and/or the like, for determining a waveform series configured to cause the representative atomic object and/or a selected atomic object from the multi-atomic object crystal to traverse the linear combination path through the junction 120. For example, the controller 30 may comprise means, such as processing device 705, memory 710, communication interface 720, and/or the like, for determining a waveform series configured to cause the representative atomic object and/or a selected atomic object from the multi-atomic object crystal to traverse the linear combination path through the junction 120. Moreover, the waveform series is determined such that application of the waveforms series to the TT electrodes (in combination with the application of the periodic voltage signal to the RF rails) causes the generation of a potential well having a well depth, a well width in the axial direction of the trap (e.g., substantially parallel to the RF rails at the location of the potential well minimum), and/or a curvature of the well in the axial direction that corresponds to the selected and/or determined axial trap frequency.

As should be noted, the path of RF minimum, the path of constant total confinement, and the waveform series are each determined based on a respective single atomic object. In various embodiments, the single atomic object is the representative atomic objection (e.g., the atomic object of the multi-atomic object crystal have the greatest mass, the least mass, an intermediary and/or median mass; a simulated and/or virtual atomic object assigned physical properties based on averaged and/or reduced physical properties of the atomic objects of the multi-atomic object crystal; and/or the like). In various embodiments, the same representative atomic object is used in the determination of the path of RF minimum, the path of constant total confinement, and the waveform series. For example, in an example embodiment, the waveform series is determined such that the waveform series is configured to cause the atomic object of the multi-atomic object crystal having the greatest mass to traverse the linear combination path through the junction 120. In an example embodiment, the waveform series is determined such that the waveform series is configured to cause the atomic object of the multi-atomic object crystal having the least mass to traverse the linear combination path through the junction 120. In an example embodiment, the waveform series is determined such that the waveform series is configured to cause an average atomic object having the average properties (e.g., mass, charge, and/or the like) of the atomic objects of the multi-atomic object crystal to traverse the linear combination path through the junction 120. In an example embodiment, the waveform series is determined such that the waveform series is configured to cause a reduced atomic object having the reduced properties (e.g., reduced mass, reduced charge, and/or the like) of the atomic objects of the multi-atomic object crystal to traverse the linear combination path through the junction 120.

In general the waveform series comprises a plurality of voltages, with each voltage associated with a respective TT electrode 135 and a respective value of the indexing variable t. For example, the waveform series comprises a voltage of a controlling voltage signal to be applied to respective TT electrode 135 for each time step of the process of transporting the multi-atomic object crystal through the junction 120. In another words, for a highly simplified instance wherein only two TT electrodes are located proximate the junction and the process of transporting the multi-atomic object crystal through the junction includes three time steps, the waveform series comprises $V_1(t_1)$, $V_2(t_1)$, $(t_2)$, $V_2(t_2)$, $(t_3)$, $V_2(t_3)$, wherein $V_i(t_j)$ is the voltage applied to the $i^{th}$ TT electrode 135 (e.g., via a respective controlling voltage signal) at time step $t_j$ of the multi-atomic object crystal transport process.

At step/operation 312, the dynamics of the multi-atomic object crystal in response to experiencing the time-dependent potential generated by the application of controlling voltage signals generated based on the determined waveform series. For example, the dynamics of the multi-atomic object crystal as the multi-atomic object crystal traverses the junction 120 based on the determined waveform series are simulated. For example, the simulation may indicate an actual transport path that the multi-atomic object crystal (and/or constituents thereof) are expected to travel through the junction based on the multi-atomic object crystal experiencing a time-dependent potential well generated based on the determined waveform series. As noted above, the transport path starts at a point on the RF null of the first leg proximate the junction 120 and ends at a point on the RF null of the second leg proximate the junction.

For example, the computing entity 10 and/or controller 30 simulates and/or determines the dynamics of the multi-atomic object crystal as the multi-atomic object crystal traverses the junction 120 based on application of controlling voltage signals generated based on the determined waveform series to the TT electrodes 135 while the atomic object confinement apparatus is being operated in accordance with the selected and/or determined axial frequency. For example, the computing entity 10 may comprise means, such as processing device 808, memory 822, 824, and/or the like, for simulating and/or determining dynamics of the multi-atomic object crystal traversing the junction 120 based on the determined waveform series. For example, the controller 30 may comprise means, such as processing device 705, memory 710, communication interface 720, and/or the like, for simulating and/or determining dynamics of the multi-atomic object crystal traversing the junction 120 based on the determined waveform series. In an example embodiment, the dynamics of each atomic object of the multi-atomic object crystal is determined individual and may then be modified based on the interactions between the atomic objects of the multi-atomic object crystal.

In an example embodiment, the simulation and/or determination of the dynamics of the multi-atomic object crystal is performed and/or determined based on Newtonian mechanics, electrostatics, and/or electrodynamics. For example, for each time step of the process of transporting the multi-atomic object crystal through the junction 120, the forces experienced by each atomic object of the multi-atomic object crystal are determined. In various embodiments, the forces experienced by an atomic object of the multi-atomic object crystal are due to interactions between the atomic object and the pseudopotential (e.g., generated by application of the periodic voltage signals to the RF rails 130), the potential generated by the TT electrodes (e.g., as a result of applying the controlling voltage signals that are determined and/or generated based on the waveform series and that are applied to the TT electrodes 135), the presence of the other atomic objects of the multi-atomic object crystal, and/or the like (e.g., any magnetic fields or other electric fields that may be expected to be present). Once the forces experienced by an atomic object are determined, Newtonian mechanics (e.g., force equal mass times acceleration, for example) or other mechanics paradigms may be used to determine and/or simulate the dynamics of the multi-atomic object crystal as the multi-atomic object crystal traverses the junction 120 based on the determined waveform series.

At step/operation 314, the excitation (e.g., non-adiabatic excitation) experienced by the simulated multi-atomic object crystal is determined based on the simulated and/or determined dynamics (e.g., simulated and/or determined at step/operation 312). For example, the computing entity 10 and/or controller 30 determines the excitation (e.g., non-adiabatic excitation) experienced by the simulated multi-atomic object crystal is determined based on the simulated and/or determined dynamics. For example, the computing entity 10 may comprise means, such as processing device 808, memory 822, 824, and/or the like, for determining the excitation (e.g., non-adiabatic excitation) experienced by the simulated multi-atomic object crystal is determined based on the simulated and/or determined dynamics. For example, the controller 30 may comprise means, such as processing device 705, memory 710, communication interface 720, and/or the like, for determining the excitation (e.g., non-adiabatic excitation) experienced by the simulated multi-atomic object crystal is determined based on the simulated and/or determined dynamics.

For example, in an example embodiment, the non-adiabatic excitation experienced by the simulated multi-atomic object crystal based on the simulated and/or determined dynamics is determined by analyzing the interactions between the atomic objects of the multi-atomic object crystal and/or the motion of the atomic objects of the multi-atomic object crystal. As should be understood, an adiabatic process is a process in which there is not an exchange of heat between a system (e.g., the multi-atomic object crystal) and its surroundings. Thus, non-adiabatic excitation of the multi-atomic object crystal amounts to the heating and/or addition of energy to the multi-atomic object crystal as the simulated multi-atomic object crystal traverses the junction 120.

In an example embodiment, the non-adiabatic excitation of the multi-atomic object crystal is determined by, for the final voltage set of the waveform series, determining the equilibrium position of the multi-atomic object crystal (e.g., with all velocities and net forces equal to zero). From this equilibrium position, the final velocities and positions from the dynamics simulation are subtracted, and the excess energy is determined $$(\text{e.g., } \frac{1}{2}mv^2 + E_U,$$

where m is the mass of the multi-atomic object crystal, v is the difference in the velocity of the equilibrium position and the final velocity of the multi-atomic object crystal from the dynamics simulation, and $E_U$ is the potential energy difference of the equilibrium position potential energy and the final potential energy of the multi-atomic object crystal form the dynamics simulation. The excess energy is the non-adiabatic excitation of the multi-atomic object crystal.

In an example embodiment, the non-adiabatic excitation of the multi-atomic object crystal is determined by performing a second dynamics simulation in a static potential determined by the final voltage set of the waveform series, with initial conditions given by the final velocities and positions of the initial dynamics simulation. The resulting motion in the second dynamics simulation is fit using various curves (e.g., sines and/or cosines) and the oscillation amplitudes are extracted therefrom. The non-adiabatic excitation of the multi-atomic object crystal is then determined based on the extracted oscillation amplitudes.

As should be understood, the electric fields generated by applying the waveform series to the electrodes is dependent on the geometry of the electrodes. For example, the layout, shape, and/or size of electrodes may be different between two different atomic object confinement apparatuses. Thus, the resulting (non-adiabatic) excitation experienced by the multi-atomic object crystal is also dependent on the geometry of the electrodes of the atomic object confinement apparatus. As such, the transport path through a junction that minimizes the (non-adiabatic) excitation of experienced by the simulated multi-atomic object crystal may be different for different atomic object confinement apparatuses.

At step/operation 316, it is determined whether the (non-adiabatic) excitation experienced by the simulated multi-atomic object crystal based on the dynamics determined at step/operation 312 satisfies one or more minimization criteria. For example, the computing entity 10 and/or controller 30 determines whether the (non-adiabatic) excitation experienced by the simulated multi-atomic object crystal based on the dynamics determined at step/operation 312 satisfies one or more minimization criteria. For example, the computing entity 10 may comprise means, such as processing device 808, memory 822, 824, and/or the like, for determining whether the (non-adiabatic) excitation experienced by the simulated multi-atomic object crystal based on the dynamics determined at step/operation 312 satisfies one or more minimization criteria. For example, the controller 30 may comprise means, such as processing device 705, memory 710, communication interface 720, and/or the like, for determining whether the (non-adiabatic) excitation experienced by the simulated multi-atomic object crystal based on the dynamics determined at step/operation 312 satisfies one or more minimization criteria.

In various embodiments, the minimization criteria is configured to determine whether the (non-adiabatic) excitation experienced by the simulated multi-atomic object crystal is minimized within constraints of the system (e.g., the axial frequency being in the acceptable or allowed range of axial frequencies, and/or the like). For example, a gradient of the (non-adiabatic) excitation experienced by the simulated multi-atomic object crystal as a function of the axial frequency and/or the path ratio may be determined (e.g., based on one or more iterations of steps/operations 304-314, based on an analytic and/or numerical calculation based on the present iteration of steps/operations 304-314, and/or the like). For example, determined (non-adiabatic) excitation for the current iteration of steps/operations 304-314 may be compared to previous determinations of the (non-adiabatic) excitation determined on previous iterations. In various embodiments, various optimization techniques are used to explore the axial frequency and path ratio space to determine which combination of axial frequency and path ratio provide optimal and/or minimal (non-adiabatic) excitation of the multi-atomic object crystal. In an example embodiment, a Nelder-Mead optimization technique is used to determine the combination of axial frequency and path ratio provide optimal and/or minimal (non-adiabatic) excitation of the multi-atomic object crystal.

When, at step/operation 316, it is determined that the minimization criteria is satisfied by the (non-adiabatic) excitation of the simulated multi-atomic object crystal determined based on the dynamics determined at step/operation 312, the process continues to step/operation 318. At step/operation 318, the waveform series is provided as output and/or stored for later use. For example, the computing entity 10 and/or controller 30 provides as output and/or stores for later use the waveform series determined at the current/most recent iteration of step/operation 310. For example, the computing entity 10 may comprise means, such as processing device 808, memory 822, 824, network interface 820, antenna 812 and transmitter 804, and/or the like, for providing as output and/or storing for later use the waveform series determined at the current/most recent iteration of step/operation 310. For example, the controller 30 may comprise means, such as processing device 705, memory 710, communication interface 720, and/or the like, for providing as output and/or storing for later use the waveform series determined at the current/most recent iteration of step/operation 310. In various embodiments, the waveform series is stored with meta data. For example the meta data may describe the multi-atomic object crystal for which the waveform series was determined (e.g., the number of each atomic species in the multi-atomic object crystal, an ordering of the atomic objects in the multi-atomic object crystal, and/or the like), a junction traversal type (e.g., continuing through the junction 120 (e.g., 110B to 110D, or vice versa, or 110A to 110C, or vice versa), a right-hand turn (e.g., 110A to 110D, 110D to 110C, 110C to 110B, 110B to 110A), a left-hand turn (e.g., 110A to 110B, 110B to 110C, 110C to 110D, 110D to 110A), and/or the like as appropriate for the topology of the junction 120), an associated axial frequency and/or $U_{end}$ for generating an axial trapping field having the associated axial frequency, and/or the like.

In various embodiments, the waveform series and any associated meta data are stored to a computer-readable memory that is accessible to processing device 705 of the controller 30. In an example embodiment, the waveform series is stored to a library of machine level language operations, transport operations, and/or waveform series for use by the controller 30 during performance of one or more quantum computations, quantum circuits, and/or the like. For example, the waveform series may be stored for use in real time or near real time access and/or use by the controller 30 as the controller 30 is controlling the quantum processor 615 of the quantum computer 610 to perform one or more quantum operations, quantum circuits, and/or the like (see FIG. 6).

When, at step/operation 316, it is determined that the minimization criteria is not satisfied by the (non-adiabatic) excitation of the simulated multi-atomic object crystal determined based on the dynamics determined at step/operation 312, the process continues to step/operation 320. At step/operation 320, the axial frequency and/or path ratio is adjusted, modified, updated, and/or the like to reduce the (non-adiabatic) excitation of the simulated multi-atomic object crystal. For example, when a gradient of the (non-adiabatic) excitation experienced by the simulated multi-atomic object crystal as a function of the axial frequency and/or the path ratio is determined, the axial frequency and/or path ratio is adjusted, modified, updated, and/or the like based thereon such that the newly determined and/or selected axial frequency and/or path ratio is expected to result in a lower (non-adiabatic) excitation of the simulated multi-atomic object crystal. For example, the computing entity 10 and/or controller 30 adjusts, modifies, updates, and/or the like the axial frequency and/or path ratio such that the newly determined and/or selected axial frequency and/or path ratio causes the (non-adiabatic) excitation for the simulated multi-atomic object crystal is expected to be, likely to be, and/or may be reduced on the next iteration of steps/operations 304-314 (e.g., compared to the current and/or most recent iteration of steps/operations 304-314).

In an example embodiment, the path ratio is adjusted, modified, updated, and/or the like such that the path ratio is within the range of 0 to 1 inclusive. In an example embodiment, the path ratio is adjusted, modified, updated, and/or the like such that the path ratio is within the range of 0 to 1 exclusive.

For example, the computing entity 10 may comprise means, such as processing device 808, memory 822, 824, and/or the like, for adjusting, modifying, updating, and/or the like the axial frequency and/or path ratio such that the newly determined and/or selected axial frequency and/or path ratio causes the (non-adiabatic) excitation for the simulated multi-atomic object crystal is expected to be, likely to be, and/or may be reduced on the next iteration of steps/operations 304-314. For example, the controller 30 may comprise means, such as processing device 705, memory 710, communication interface 720, and/or the like, for adjusting, modifying, updating, and/or the like the axial frequency and/or path ratio such that the newly determined and/or selected axial frequency and/or path ratio causes the (non-adiabatic) excitation for the simulated multi-atomic object crystal is expected to be, likely to be, and/or may be reduced on the next iteration of steps/operations 304-314.

The process then returns to step/operation 304 and the path of constant total confinement for the representative atomic object is determined based on the newly determined and/or selected axial frequency. The path of RF minimum for the representative atomic object is also determined based on the newly determined and/or selected axial frequency. A new linear combination path is then determined based on the determined path of constant total confinement and the path of RF minimum and the newly determined and/or selected path ratio. The waveform series configured to cause the representative atomic object to traverse the new linear combination path through the junction 120 is then determined. The dynamics of a multi-atomic object crystal as a result of experiencing a time-dependent potential well generated by the application of controlling voltage signals determined based on the determined waveform series is then determined and the (non-adiabatic) excitation experienced by the simulated multi-atomic object crystal is also determined. This process is repeated with the axial frequency and/or path ratio being adjusted, modified, updated, and/or the like at each iteration until the minimization criteria are satisfied and/or until a maximum number of iterations is performed.

In various embodiments, the waveform series determination process illustrated in FIG. 3 may be modified in various ways to determine a waveform series that causes the multi-atomic object crystal to traverse a transport path through the junction 120 based on a linear combination of at least the path of RF minimum and the path of constant total confinement. For example, in an example embodiment, the waveform series determination process may include determining and using a set of constraints that take into account the pseudopotential experienced by each of two or more atomic objects of the multi-atomic object crystal. For example, the waveform series determination process may consider the pseudopotential experienced by each species of the multi-atomic object crystal. For example, if the multi-atomic object crystal consists of a first atomic object of a first species and a second atomic object of a second species (the first and second species being different and/or having different masses), the waveform series determination process may consider a first pseudopotential experienced by the first atomic object and a second pseudopotential experienced by the second atomic object. For example, a set of constraints may be defined for each species present in the multi-atomic object crystal and the computing entity 10 and/or controller 30 may attempt to solve for all of the sets of constraints simultaneously (e.g., with a single waveform series).

In another example, constraints applied to the first, second, third, fourth, and/or fifth order derivatives of the time-dependent potential well and/or waveform series (e.g., derivatives with respect to spatial coordinates and/or time) may be added, modified, and/or the like. For example, constraints may be applied to various spatial derivatives of the total potential (e.g., the combination of the potential generated by application of controlling voltage signals to the TT electrodes and periodic voltage signals to the RF rails) evaluated at each time step and/or at various points along the chosen path.

In another example, the path of constant total confinement, the path of RF minimum, and a path of minimized (non-adiabatic) excitation for each species present in the multi-atomic object crystal are determined. For example, when the multi-atomic object crystal includes a first atomic object of a first species and a second atomic object of a second species (e.g., the first and second species being different), the path of constant total confinement for a representative atomic object, the path of RF minimum for the representative atomic object, the path of minimized (non-adiabatic) excitation for the first atomic object, and the path of minimized (non-adiabatic) excitation for the second atomic object are determined. An optimized weighted average and/or linear combination of the determined paths is then determined. For example, the weights applied to each determined path when determining the weighted average and/or linear combination may be optimized to reduce and/or minimize (non-adiabatic) excitation of the multi-atomic object crystal as a whole as the multi-atomic object crystal traverses the junction 120. A waveform series is then determined, defined, and/or generated based on the optimized weighted average and/or linear combination of the determined paths. In various embodiments, various constraints may be considered when determining a transport path that is a weighted average and/or linear combination of at least the path of constant total confinement and the path of RF minimum and determining, defining, and/or generating a waveform series based the determined transport path.

In various embodiments, the path ratio and the axial frequency are allowed to change during the transport of the multi-atomic object crystal through the junction. For example, the path ratio and axial trap frequency are defined at multiple points along the path through the junction and the path ratio and axial trap frequency are allowed to change between adjacent points (e.g., the path ratio/axial frequency at the first snapshot 502 of FIG. 5 need not (but could) be equal to the path ratio/axial frequency at the second snapshot 504 and/or third snapshot 506), in an example embodiment. Thus, the path ratio of the transport path is a particular variable path ratio. Moreover, the potential well that travels and/or moves through the junction to cause the multi-atomic object crystal to traverse the transport path is characterized by a particular variable axial frequency. In an example embodiment, the principal axes of the trapping potential are allowed to vary in a similar manner as the path ratio and axial frequency. For example, the principal axes of the trapping potential are defined at multiple points along the path through the junction and are allowed to change directions and/or rotate between adjacent points. For example, the axis of the lowest-frequency axial mode of the potential well may rotate or be rotated along the transport path through the junction.

In various embodiments, the particular variable path ratio is within the range of 0 to 1 inclusive at a start point of the transport path through the junction (the start point disposed on the first leg and corresponding to a start time) and at the end point of the transport path through the junction (disposed on the second leg and corresponding to an end time). In various embodiments, the particular path ratio is within the range of 0 to 1 inclusive at all points along the transport path that are disposed along the first leg and/or the second leg, but is not required to be within the range of 0 to 1 inclusive at one or more points within the junction. In an example embodiment, the particular variable path ratio is within the range of 0 to 1 includes at each point along the transport path. In an example embodiment, the particular variable path ratio is not required to be within the range of 0 to 1 inclusive at one or more points other than the start point on the first leg and the end point on the second leg. In an example embodiment, the particular variable path ratio is within the range of 0 to 2 inclusive at each point along the transport path.

In various embodiments, the determined transport path is determined based on a cost function that takes into account minimizing the (motional and/or non-adiabatic) excitation of the multi-atomic object crystal during the transport of the multi-atomic object crystal through the junction and that also takes into account penalties for high required DC voltages (e.g., high voltage controlling voltage signals) or other similar terms.

Example Transport of a Multi-Atomic Object Crystal Through a Junction

Various embodiments cause a multi-atomic object crystal to be transported as a whole through a junction of a multi-dimensional atomic object confinement apparatus. In other words, as used herein, when the multi-atomic object crystal traverses the junction or is transported across and/or through the junction, all of the atomic objects of the multi-atomic object crystal are transported together (e.g., simultaneously) through the junction from the first leg to the second leg. This offers significant advantages over conventional multi-atomic object crystal transportation methods wherein the multi-atomic object crystal is decomposed in the first leg, the atomic objects are individually transported across the junction one at a time, and then the atomic objects are recombined into the multi-atomic object crystal in the second leg. In particular, various embodiments that transport the multi-atomic object as a whole through the junction are faster (e.g., requires less time to perform the transport of the multi-atomic object crystal) than conventional junction transport processes. Additionally, various embodiments enable the use of sympathetic cooling during the junction transport process (e.g., while the multi-atomic object crystal is located within the junction), which reduces the likelihood of losing at atomic object during the junction transport process and/or reduces the amount of cooling required after performance of the junction transport process.

Figure 4:
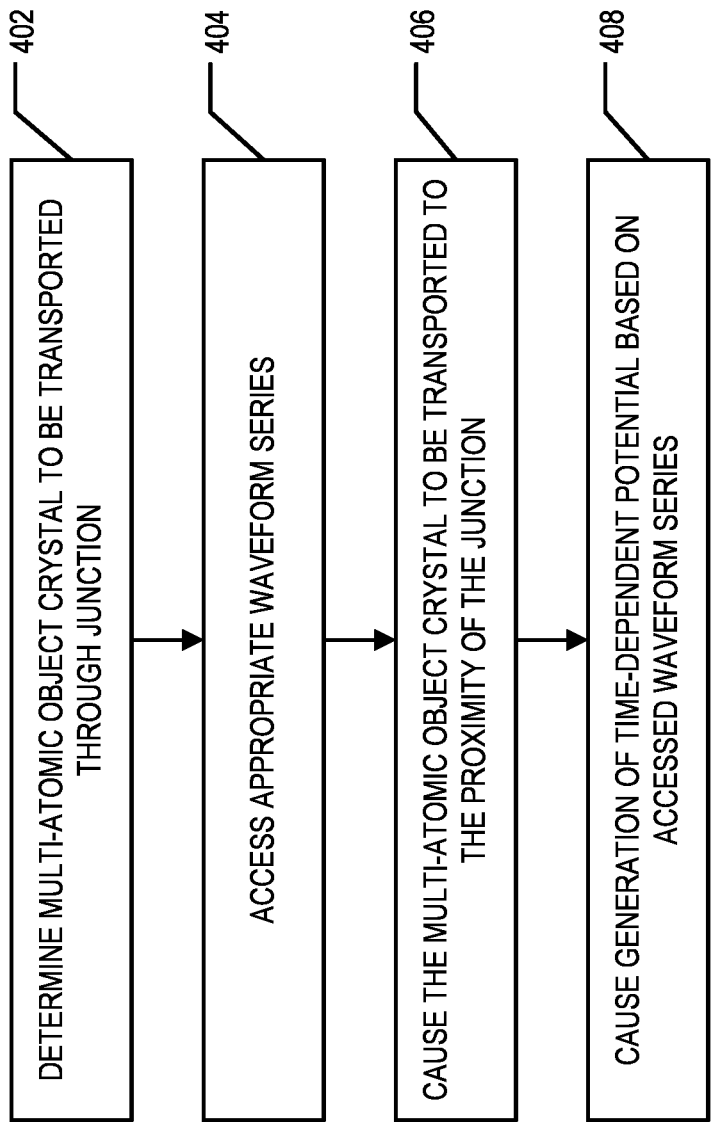
FIG. 4 is a flowchart of various processes, procedures, and/or operations that may be performed, for example, by a controller of the atomic object confinement apparatus, to transport a multi-atomic object through a junction of the atomic object confinement apparatus, in accordance with an example embodiment.

FIG. 4 provides a flowchart illustrating example processes, procedures, operations, and/or the like for causing a multi-atomic object to be transported through and/or across a junction 120 using a waveform series determined based on a transport path that is a weighted average and/or linear combination of at least the path of RF minimum and the path of constant total confinement. In various embodiments, the transport process described by FIG. 4 is configured to cause the multi-atomic object to be transported through and/or across the junction 120 in a controlled and/or reliable manner. In an example embodiment, the transport process described by FIG. 4 is configured to cause the multi-atomic object to be transported through and/or across the junction 120 quickly and/or with minimal heating/excitation. In various embodiments, the multi-atomic object crystal survives the transport through the junction (e.g., each of the atomic objects of the multi-atomic object crystal completes the transport through the junction to the destination leg) more than 95% of the time. For example, in an example embodiment, the multi-atomic object crystal survives the transport through the junction more than 98% of the time. In various embodiments, the survival rate is high (e.g., greater than 95%, 98%, and/or the like) and the measured excitation is low (e.g., approximately 0.125 quanta of energy per leg traversed and 0.875 quanta of energy per leg traversed in the two normal modes of axial motion, in an example embodiment).

Starting at step/operation 402, it is determined that a multi-atomic object crystal is to be transported through a junction 120. For example, a controller 30 may be controlling (e.g., in real time or near real time) a quantum processor 615 of a quantum computer 610 to cause the quantum processor to perform one or more quantum calculations, a quantum circuit, and/or the like. The controller 30 may determine that in order to continue performing the one or more quantum calculations, quantum circuit, and/or the like, a multi-atomic object crystal should be transported across and/or through a junction from a first leg 110 the atomic object confinement apparatus 100 to second leg 110 of atomic object confinement apparatus 100, where the first leg and the second leg are connected to one another via the junction 120. For example, the multi-atomic object crystal may be present in the first leg 110 (e.g., 110A) and may need to be moved to a second leg (e.g., 110B, 110C, or 110D) for the performance of a quantum operation. In an example embodiment, the quantum operation is performed on the multi-atomic object crystal in the second leg or a third leg that is reachable by traversing the second leg. For example, the controller 30 may comprise means, such as processing device 705, memory 710, and/or the like for determining that a multi-atomic object crystal is to be transported from a first leg to a second leg.

Responsive to determining that the multi-atomic object crystal is to be transported through the junction 120 from a first leg to a second leg, an appropriate waveform series is accessed. For example, the controller 30 may access an appropriate waveform series for transporting the multi-atomic object crystal through the junction 120 from the first leg to the second leg. For example, the access waveform series may correspond to the transport path through the junction corresponding to transporting the multi-atomic object crystal from the first leg, which defines a first direction, at least proximate the junction 120, to the second leg, which defines a second direction, at least proximate the junction 120. In various instances, the first direction and the second direction may be substantially parallel to one another and the transport path corresponding to the accessed waveform series corresponds to the first direction and the second direction being substantially parallel. In various instances, the first direction and the second direction are transverse to one another and/or form a transport angle therebetween that is greater than zero degrees and less than 180 degrees and the access waveform series corresponds to a transport path that includes a change in direction corresponding to the transport angle. For example, in various embodiments, the controller 30 comprises means, such as processing device 705, memory 710, and/or the like for accessing an appropriate waveform series. For example, the waveform series may be accessed from a library of machine level language operations, transport operations, and/or waveform series for use by the controller 30 during performance of one or more quantum computations, quantum circuits, and/or the like (e.g., stored in memory 710).

In various embodiments, the atomic object confinement apparatus is being controlled (e.g., via the controller 30) to confine and/or trap one or more atomic objects, such as one or more multi-atomic object crystals. At step/operation 406, the controller 30 causes the multi-atomic object crystal to be transported along the first leg to proximate the junction 120. For example, the controller 30 may cause one or more voltage sources 50 to generate and provide controlling voltage signals to one or more TT electrodes 135 of the first leg that generate a time-dependent potential well that transports the multi-atomic object crystal along the first leg 110 to proximate the junction 120. When the multi-atomic object crystal is proximate the junction 120, the multi-atomic object is disposed along the RF null 108 of the first leg, in an example embodiment. For example, the multi-atomic object crystal is proximate the junction 120 when the multi-atomic object is located at a first end of the transport path that extends from the first leg to the second leg and that corresponds to the accessed waveform series. For example, the controller 30 comprises means, such as processing device 705, memory 710, driver controller elements 715, and/or the like for causing the multi-atomic object to be transported along the first leg to proximate the junction 120.

In various embodiments, the multi-atomic object crystal is transported such that the multi-atomic object crystal is disposed in a potential well that is located proximate the junction 120 and that defines an axial frequency that is substantially equal to the particular axial frequency. For example, the accessed waveform series indicates the particular axial frequency corresponding to the accessed waveform series and the voltages sources 50 are controlled (e.g., via the controller 30) to generate and/or provide controlling voltage signals that generate a potential well characterized by the particular axial frequency and located proximate the junction 120.

In an example embodiment, the accessed waveform series corresponds to a particular ordering of the atomic objects within the multi-atomic object crystal. For example, in an example embodiment, the accessed waveform series corresponds to the atomic objects of the multi-atomic object crystal being ordered by mass (e.g., the atomic object having the most mass being closest to the junction 120 and the atomic object having the least mass being furthest from the junction 120). In an example embodiment, while the multi-atomic object crystal is being transported along the first leg to proximate the junction 120, the atomic objects within the multi-atomic object crystal are rearranged and/or reordered to be ordered based on the particular ordering of the atomic objects corresponding to the accessed waveform series.

At step/operation 408, the multi-atomic object crystal is transported from the first leg to the second leg along the transport path. For example, the controller 30 causes the multi-atomic object crystal to be transported from the first leg to the second leg along a transport path generated based on a linear combination of at least the path of RF minimum for a representative atomic object of the multi-atomic object crystal and the path of constant total confinement for the representative atomic object. For example, the controller 30 causes the voltage sources 50 to generate and provide controlling voltage signals that are applied to the TT electrodes 135 of the first and/or second leg and/or part of the junction 120. The controlling voltage signals are generated based on the accessed waveform series to cause the multi-atomic object crystal to be transported from the first leg to the second leg through the junction 120. For example, when controlling voltage signals generated based on the accessed waveform series are applied to TT electrodes 15 proximate a junction 120, the time-dependent potential well generated thereby causes a multi-atomic object crystal to be transported through the junction from the first leg to the second leg along the transport path.

Figure 5:
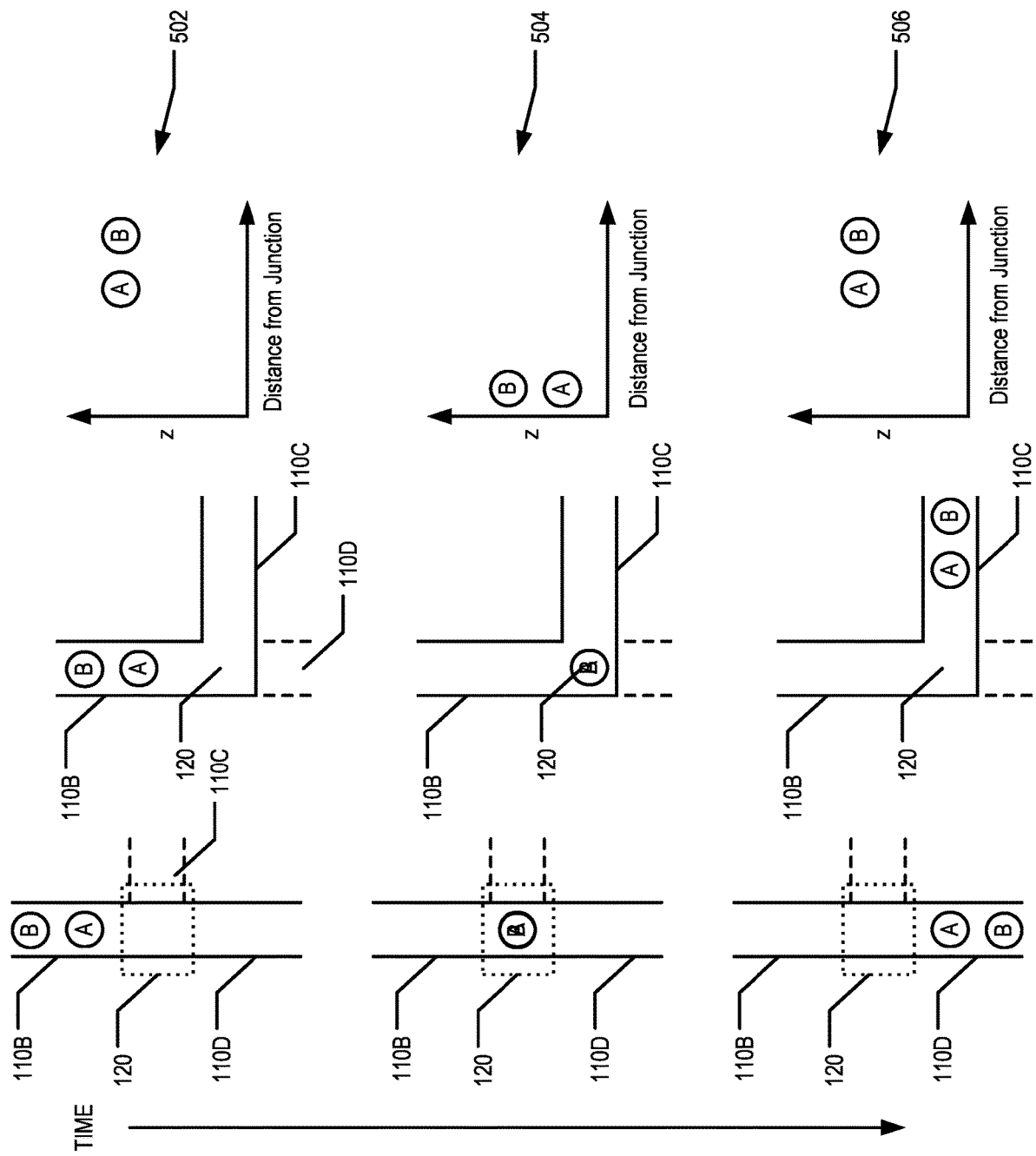
FIG. 5 is a schematic diagram illustrating sets of example multi-atomic object crystal trajectories through a junction, in accordance with an example embodiment.

FIG. 5 provides three snapshots in time illustrating the dynamics of a multi-atomic object at different points in time along the transport path as the multi-atomic object is being transported through a junction 120 from a first leg 110B to a second leg 110C or 110D. In the illustrated scenario, the multi-atomic object crystal comprises a first atomic object A and a second atomic object B. The first atomic object A is of a first species having a first mass and the second atomic object B is of a second species having a second mass. The first mass is greater than the second mass. The first column shows an instance of the multi-atomic object crystal comprising the first atomic object A and the second atomic object B being transported from a first leg 110B to a second leg 110D through junction 120, where the first leg 110B and the second 110D define directions, at least proximate the junction 120, that are substantially parallel to one another. The second column shows an instance of the multi-atomic object crystal comprising the first atomic object A and the second atomic object B being transported from a first leg 110B to a second leg 110C through junction 120, wherein the first leg 110B and the second 110C define directions, at least proximate the junction 120, that are transverse to one another. The third column illustrates the height of the first atomic object A and the second atomic object B above the surface of the atomic object confinement apparatus 100 (e.g., in the z-direction as illustrated in FIG. 1B).

The first snapshot 502 is taken at a first time while the multi-atomic object is disposed within the first leg 110B proximate the junction 120. For example, the first snapshot 502 illustrates the multi-atomic object located at or proximate the start point and/or at a first end of the transport path. The first atomic object A, the atomic object having the greater mass, is located closer to the junction 120 than the second atomic object B. The first atomic object A and the second atomic object B are disposed on the RF null 108B of the first leg 110B and therefore at located at the same height above the surface of the atomic object confinement apparatus 100.

The second snapshot 504 is taken at a second time where the multi-atomic object crystal is located in the middle of the junction 120. For example, the second snapshot 504 corresponds to when the multi-atomic object is located at a middle point (e.g., a mid-point) of the transport path. The first atomic object A and the second atomic object B have changed position with respect to one another such that, based on the coordinates shown in FIG. 1B, the first atomic object A and the second atomic object B have approximately the same x and y coordinates and different z coordinates. For example, the first atomic object A is located between the second atomic object B and the surface of the atomic object confinement apparatus 100. The different changes in height experienced by the first atomic object A and the second atomic object B is due to the first and second atomic objects experiencing different values or amplitudes of the pseudo-potential due to their different masses.

The third snapshot 506 is taken at a third time where the multi-atomic object crystal is located within the second leg 110D or 110C (e.g., along the RF null 108D, 108C). For example, the third snapshot is taken when the multi-atomic object crystal is located in the second leg 110D or 110C at a second end of the transport path (e.g., proximate or at the end point). As the first and second atomic objects are located along the RF null 108D, 108C of the second leg 110D, 110C at the third snapshot, the first atomic object A and the second atomic object B are located at the same height above the surface of the atomic object confinement apparatus 100. The first atomic object A is located closer to the junction 120 than the second atomic object B. In other words, as the multi-atomic object crystal traverses the junction 120, the multi-atomic object crystal is reordered.

In various embodiments, the multi-atomic object crystal comprises at least one atomic object that is configured to be used as a sympathetic cooling atomic object. In other words, at least one atomic object of the multi-atomic object crystal is configured to be used to sympathetically cool one or more other atomic objects of the multi-atomic object crystal. As the multi-atomic object crystal is transported through the junction 120 together (e.g., as a crystal), sympathetic cooling can be performed while the transportation process is occurring. For example, as the multi-atomic object crystal moves through the junction 120 (e.g., in between the first time corresponding to the first snapshot 502 and the third snapshot 506), sympathetic cooling can be performed, in various embodiments. For example, the controller 30 may control one or more manipulation sources 60 (see FIG. 6) configured to generate and provide one or more manipulation signals configured to perform sympathetic cooling of the multi-atomic object crystal during the transportation process. Thus, when the multi-atomic object crystal arrives in the second leg, the multi-atomic object crystal requires less cooling than if the sympathetic cooling had not been performed during the transportation process.

Technical Advantages

Various embodiments provide technical solutions to the technical problem of transporting a multi-atomic object crystal through a junction of a multi-dimensional atomic object confinement apparatus. Various embodiments provide technical solutions to the technical problem of transporting multiple species multi-atomic object crystal through a junction of a multi-dimensional atomic object confinement apparatus. For example, various embodiments provide techniques for determining waveform series that, when controlling voltage signals generated based on the waveform series are applied to TT electrodes proximate a junction, cause a multi-atomic object crystal to be transported through the junction in a reliable manner (e.g., without the multi-atomic object crystal and/or atomic objects thereof becoming overly excited and/or being lost from the atomic object confinement apparatus). Various embodiments provide techniques for applying such waveform series to transport multi-atomic object crystals through a junction of an atomic object confinement apparatus.

Conventionally, to transport a multi-atomic object crystal through a junction, the crystal is decomposed in the first leg, the atomic objects are transported through the junction one at a time, and the crystal is re-formed in the second leg. However, this decomposed transportation of the multi-atomic object crystal takes a considerable amount of time. For example, used of decomposed transportation of multi-atomic object crystals in a multi-dimensional atomic object confinement apparatus that is part of a quantum process or a quantum computer greatly reduces the efficiency of the quantum computer by causing significant time delays. Additionally, such decomposed transportation of multi-atomic object crystals does not permit the performance of sympathetic cooling during the transportation process. As noted above, in various embodiments, sympathetic cooling is performed during the transportation process that provides the additional technical advantage of requiring less time to perform transportation cooling.

Thus, various embodiments provide technical improvements to the field of transporting multi-atomic objects through junctions of multi-dimensional atomic object confinement apparatuses. In particular, various embodiments reduce the time required to transport multi-atomic object crystals through junctions, increase the reliability of such transportation processes, and/or reduce the amount of post-transportation process cooling required.

Exemplary Quantum Computer Comprising an Atomic Object Confinement Apparatus

Figure 6:
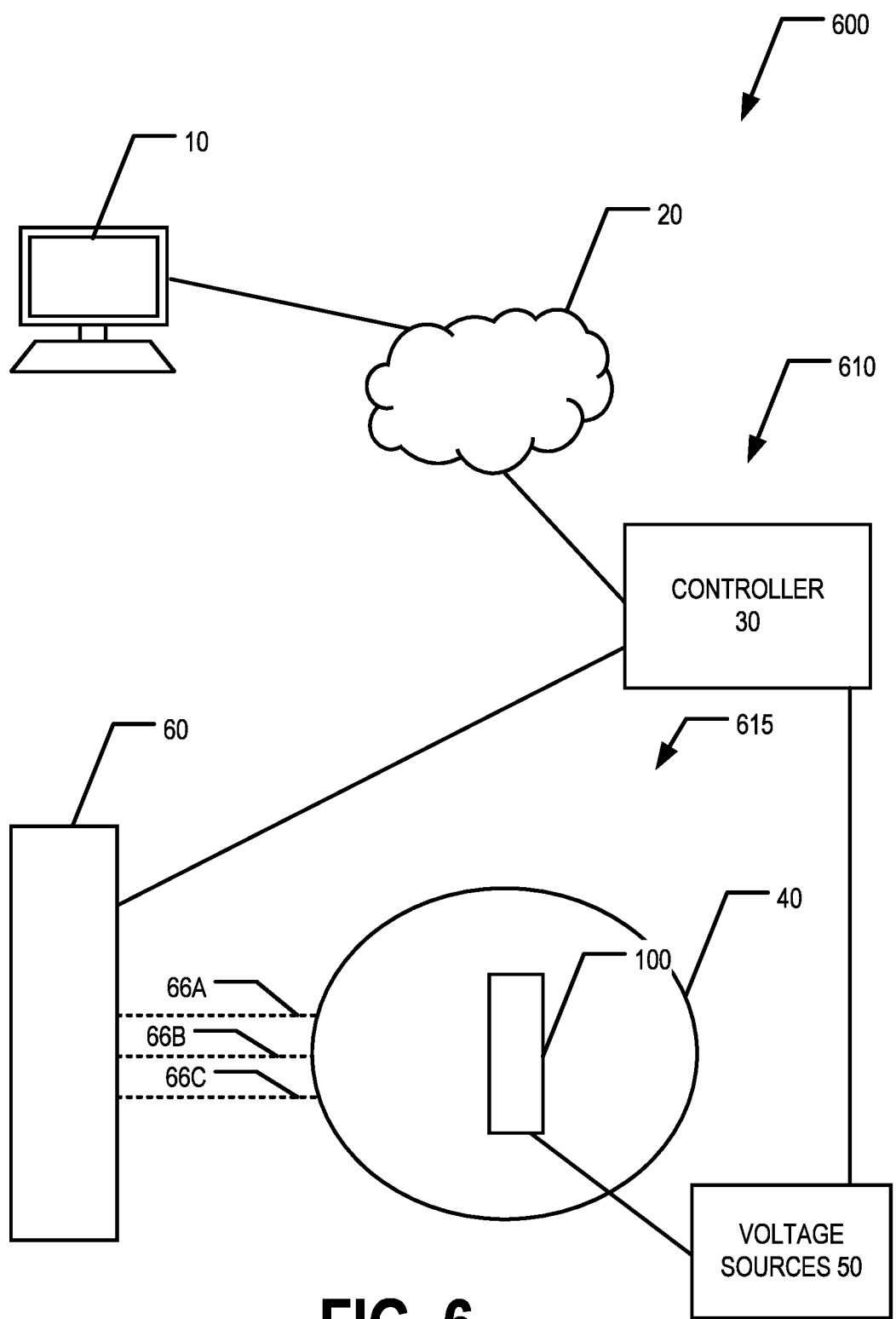
FIG. 6 is a schematic diagram illustrating an example quantum computing system comprising a multi-dimensional atomic object confinement apparatus and configured to transport multi-atomic object crystals through at least one junction of the multi-dimensional atomic object confinement apparatus, according to various embodiments.

As described above, the transportation of the multi-atomic object crystal through the junction of the atomic object confinement apparatus is controlled by a controller 30 of a quantum computer 610, in various embodiments. FIG. 6 provides a schematic diagram of an example quantum computer system 600 comprising an atomic object confinement apparatus 100 (e.g., ion trap), in accordance with an example embodiment. In various embodiments, the quantum computer system 600 comprises a computing entity 10 and a quantum computer 610. In various embodiments, the quantum computer 610 comprises a controller 30 and a quantum processor 615. In various embodiments, the quantum processor 615 comprises an atomic object confinement apparatus 100 enclosed in a cryostat and/or vacuum chamber 40, one or more voltage sources 50, one or more manipulation sources 60, and/or the like.

In an example embodiment, the one or more manipulation sources 60 comprise one or more lasers (e.g., optical lasers, microwave sources, and/or the like). In various embodiments, the one or more manipulation sources 60 are configured to manipulate and/or cause a controlled quantum state evolution of one or more atomic objects within the atomic object confinement apparatus 100. For example, in an example embodiment, wherein the one or more manipulation sources 60 comprise one or more lasers, the lasers may provide one or more laser beams to the confinement apparatus within the cryogenic and/or vacuum chamber 40. The laser beams may be used to perform one or more quantum gates, sympathetic cooling, and/or the like. In various embodiments, the manipulation sources 60 are controlled by respective driver controller elements 715 of the controller 30.

In various embodiments, the quantum computer 610 comprises one or more voltage sources 50. For example, the voltage sources 50 may comprise a plurality of TT voltage drivers and/or voltage sources and/or at least one RF driver and/or voltage source. The voltage sources 50 may be electrically coupled to the corresponding potential generating elements (e.g., TT electrodes 135, RF rails 130) of the atomic object confinement apparatus 100, in an example embodiment. For example, the voltage sources 50 are configured to provide periodic voltage signals to the RF rails 130 and controlling voltage signals to the TT electrodes 135. In various embodiments, the voltages sources 50 are controlled by respective driver controller elements 715 of the controller 30.

In various embodiments, a computing entity 10 is configured to allow a user to provide input to the quantum computer 610 (e.g., via a user interface of the computing entity 10) and receive, view, and/or the like output from the quantum computer 610. The computing entity 10 may be in communication with the controller 30 of the quantum computer 610 via one or more wired or wireless networks 20 and/or via direct wired and/or wireless communications. In an example embodiment, the computing entity 10 may translate, configure, format, and/or the like information/data, quantum circuits, quantum computing algorithms, and/or the like into a computing language, executable instructions, command sets, and/or the like that the controller 30 can understand and/or implement.

In various embodiments, the controller 30 is configured to control the voltage sources 50, cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40 and/or configured to manipulate and/or cause a controlled evolution of quantum states of one or more atomic objects within the confinement apparatus. For example, the controller 30 may cause a controlled evolution of quantum states of one or more atomic objects within the confinement apparatus to execute a quantum circuit and/or algorithm. In various embodiments, the atomic objects confined within the confinement apparatus are used as qubits of the quantum computer 610. For example, the quantum process 615 may include a plurality of multi-atomic object crystals that each comprise a first atomic object used as a qubit atomic object of the quantum processor and a second atomic object used as a sympathetic cooling atomic object for use in cooling the qubit atomic object of the same multi-atomic object crystal.

Exemplary Controller

In various embodiments, an atomic object confinement apparatus is incorporated into a quantum computer 610. In various embodiments, a quantum computer 610 further comprises a controller 30 configured to control various elements of the quantum computer 610. For example, the controller 30 may be configured to control the voltage sources 50, a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the confinement apparatus.

As shown in FIG. 7, in various embodiments, the controller 30 may comprise various controller elements including processing elements and/or devices 705, memory 710, driver controller elements 715, a communication interface 720, analog-digital converter elements 725, and/or the like. For example, the processing elements and/or devices 705 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element and/or device 705 of the controller 30 comprises a clock and/or is in communication with a clock.

For example, the memory 710 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 710 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language (s), and/or the like), one or more libraries, one or more waveform series and associated meta data, and/or the like. In an example embodiment, execution of at least a portion of the computer program code stored in the memory 710 (e.g., by a processing element and/or device 705) causes the controller 30 to perform one or more steps, operations, processes, procedures and/or the like described herein for tracking the phase, location, and/or the like of an atomic object and/or multi-atomic object crystal within an atomic system and causing the adjustment of the phase of one or more manipulation sources and/or signal(s) generated thereby.

In various embodiments, the driver controller elements 710 may include one or more drivers and/or controller elements each configured to control one or more drivers. In various embodiments, the driver controller elements 715 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element and/or device 705). In various embodiments, the driver controller elements 715 may enable the controller 30 to operate a manipulation source 60. In various embodiments, the drivers may be laser drivers; vacuum component drivers; drivers for controlling the flow of current and/or voltage applied to TT, RF, and/or other electrodes used for maintaining and/or controlling the trapping potential of the atomic object confinement apparatus and/or causing transport of one or more multi-atomic object crystals; cryogenic and/or vacuum system component drivers; and/or the like. For example, the drivers may control and/or comprise TT and/or RF voltage drivers and/or voltage sources 50 that provide voltages and/or electrical signals (e.g., periodic voltage signals and/or controlling voltage signals) to the TT electrodes 135 and/or RF rails 130. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 725 configured to receive signals from one or more optical receiver components, calibration sensors, and/or the like.

In various embodiments, the controller 30 may comprise a communication interface 720 for interfacing and/or communicating with a computing entity 10. For example, the controller 30 may comprise a communication interface 720 for receiving executable instructions, command sets, and/or the like from the computing entity 10 and providing output received from the quantum computer 610 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 8 provides an illustrative schematic representative of an example computing entity 10 that can be used in conjunction with embodiments of the present invention. In various embodiments, a computing entity 10 is configured to allow a user to provide input to the quantum computer 610 (e.g., via a user interface of the computing entity 10) and receive, display, analyze, and/or the like output from the quantum computer 610.

As shown in FIG. 8, a computing entity 10 can include an antenna 812, a transmitter 804 (e.g., radio), a receiver 806 (e.g., radio), and a processing element 808 that provides signals to and receives signals from the transmitter 804 and receiver 806, respectively. The signals provided to and received from the transmitter 804 and the receiver 806, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 816 and/or speaker/speaker driver coupled to a processing element 808 and a touch screen, keyboard, mouse, and/or microphone coupled to a processing element 808). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 818 (hard or soft), a touch display, voice/speech or motion interfaces, scanners, readers, or other input device. In embodiments including a keypad 818, the keypad 818 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 822 and/or non-volatile storage or memory 824, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended That which is claimed:

1. A method for controlling an atomic object confinement apparatus to cause transportation of a multi-atomic object crystal through a junction of the atomic object confinement apparatus, the junction formed by two or more legs of the atomic object confinement apparatus, at least two of the two or more legs defining directions, at least proximate the junction, that are transverse to one another, the atomic object confinement apparatus comprising a plurality of electrodes, the method comprising:
controlling one or more voltage sources to cause generation of a time-dependent potential by applying controlling voltage signals to at least a portion of the plurality of electrodes, the time-dependent potential configured to generate a potential well that travels through the junction from a first leg of the two or more legs to a second leg of the two or more legs to cause the multi-atomic object crystal to traverse a transport path through the junction from the first leg to the second leg, wherein the transport path is determined based at least in part on a combination of at least (a) a path of constant total confinement for a representative atomic object of the multi-atomic object crystal and (b) a path of radio frequency minimum for the representative atomic object of the multi-atomic object crystal, wherein the combination is determined based on a particular variable path ratio.

2. The method of claim 1, wherein the multi-atomic object crystal comprises a first atomic object of a first species having a first mass and a second atomic object of a second species having a second mass, the first mass is greater than the second mass.

3. The method of claim 2, wherein the representative atomic object is one of (a) the first atomic object, (b) the second atomic object, (c) a reduced atomic object having physical properties determined based on reduced physical properties of two or more atomic objects of the multi-atomic object crystal, or (d) an average atomic object having physical properties determined based on average physical properties of the two or more atomic objects.

4. The method of claim 1, wherein the controlling voltage signals are generated based on a waveform series determined based at least in part on the transport path and at least one of (i) the particular variable path ratio or (ii) a particular variable axial frequency of the potential well, wherein the at least one of (i) the particular variable path ratio or (ii) the particular variable axial frequency is configured to minimize at least non-adiabatic excitation of the multi-atomic object crystal as a result of traversing the transport path.

5. The method of claim 4, further comprising, responsive to determining that the multi-atomic object crystal is to be transported from the first leg to the second leg through the junction, accessing the waveform series from memory, the waveform series defining the particular variable axial frequency.

6. The method of claim 4, wherein the waveform series is configured to cause the representative atomic object to traverse a path that is the combination of at least (a) the path of constant total confinement for the representative atomic object and (b) the path of radio frequency minimum for the representative atomic object.

7. The method of claim 4, wherein the combination is a linear combination of (a) the path of constant total confinement for the representative atomic object, (b) the path of radio frequency minimum for the representative atomic object, (c) a path of minimal non-adiabatic excitation for a first atomic object of the multi-atomic object crystal, and (d) a path of minimal non-adiabatic excitation for a second atomic object of the multi-atomic object crystal.

8. The method of claim 1, wherein at least one of (a) the particular variable path ratio, (b) a particular variable axial frequency, or (c) at least one principal axis of the confining potential is different at a first point along the transport path than at a second point along the transport path.

9. The method of claim 8, wherein the particular variable path ratio is within a range of 0 to 1 inclusive at at least a start point located on the first leg and an end point located on the second leg.

10. The method of claim 1, further comprising controlling a manipulation source to cause the manipulation source to generate and provide a sympathetic cooling beam such that the sympathetic cooling beam is incident on the multi-atomic object crystal while the multi-atomic object crystal traverses the junction.

11. The method of claim 1, wherein the atomic object confinement apparatus is part of a quantum processor, the multi-atomic object crystal comprises a first atomic object used as a qubit atomic object of the quantum processor, and the multi-atomic object crystal comprises a second atomic object used as a sympathetic cooling atomic object.

12. The method of claim 1, wherein an order of atomic objects within the multi-atomic object crystal is changed as the multi-atomic object crystal traverses the transport path.

13. The method of claim 1, further comprising:
controlling one or more voltage sources in electrical communication with one or more respective electrodes of the atomic object confinement apparatus to cause the atomic object confinement apparatus to confine the at least one multi-atomic object crystal in the first leg of the two or more legs; and
controlling the one or more voltage sources to cause transportation of the multi-atomic object crystal along the first leg to proximate the junction,
wherein the potential well is characterized by a variable axial frequency.

14. A controller comprising at least one processing device, a non-transitory memory storing executable instructions, and one or more driver controller elements, the executable instructions configured to, when executed by the processing device, cause the controller to at least:
cause the one or more driver controller elements to control one or more voltage sources to cause generation of a time-dependent potential by applying controlling voltage signals to at least a portion of a plurality of electrodes of an atomic object confinement apparatus, the time-dependent potential that travels through a junction from a first leg of the atomic object confinement apparatus to a second leg of the atomic object confinement apparatus to cause a multi-atomic object crystal to traverse a transport path through the junction from the first leg to the second leg, wherein the transport path is determined based at least in part on a combination of at least (a) a path of constant total confinement for a representative atomic object of the multi-atomic object crystal and (b) a path of radio frequency minimum for the representative atomic object of the multi-atomic object crystal, wherein the combination is determined based on a particular variable path ratio.

15. The controller of claim 14, wherein the multi-atomic object crystal comprises a first atomic object of a first species having a first mass and a second atomic object of a second species having a second mass, the first mass is greater than the second mass.

16. The controller of claim 14, wherein the controlling voltage signals are generated based on a waveform series determined based at least in part on the transport path and at least one of (a) the particular variable path ratio or (b) a particular variable axial frequency of the time-dependent potential, wherein the at least one of (a) the particular variable path ratio or (b) the particular variable axial frequency is configured to minimize non-adiabatic excitation of the multi-atomic object crystal as a result of traversing the transport path.

17. The controller of claim 16, wherein the waveform series is stored in the memory, the waveform series defining the particular variable axial frequency, and the executable instructions are further configured to, when executed by the processing device, cause the controller to at least, responsive to determining that the multi-atomic object crystal is to be transported from the first leg to the second leg through the junction, access the waveform series from the memory.

18. The controller of claim 16, wherein the combination is a linear combination of (a) the path of constant total confinement for the representative atomic object, (b) the path of radio frequency minimum for the representative atomic object, (c) a path of minimal non-adiabatic excitation for a first atomic object of the multi-atomic object crystal, and (d) a path of minimal non-adiabatic excitation for a second atomic object of the multi-atomic object crystal.

19. The controller of claim 16, the executable instructions are further configured to, when executed by the processing device, cause the controller to at least cause the one or more driver controller elements to control operation of a manipulation source to cause the manipulation source to generate and provide a sympathetic cooling beam such that the sympathetic cooling beams is incident on the multi-atomic object crystal while the multi-atomic object crystal traverses the junction.

20. The controller of claim 16, wherein the atomic object confinement apparatus is part of a quantum processor, the multi-atomic object crystal comprises a first atomic object used as a qubit atomic object of the quantum processor, and the multi-atomic object crystal comprises a second atomic object used as a sympathetic cooling atomic object.

* * * * *